US007827193B2

(12) United States Patent
Chiba

(10) Patent No.: US 7,827,193 B2
(45) Date of Patent: Nov. 2, 2010

(54) FILE SHARING SYSTEM, FILE SHARING DEVICE AND FILE SHARING VOLUME MIGRATION METHOD

(75) Inventor: Daigo Chiba, Odawara (JP)

(73) Assignee: Hitachi, Ltd., Tokyo (JP)

( * ) Notice: Subject to any disclaimer, the term of this patent is extended or adjusted under 35 U.S.C. 154(b) by 170 days.

(21) Appl. No.: 11/657,564

(22) Filed: Jan. 25, 2007

(65) Prior Publication Data
US 2008/0126437 A1 May 29, 2008

(30) Foreign Application Priority Data
Nov. 27, 2006 (JP) ............................. 2006-318892

(51) Int. Cl.
*G06F 7/00* (2006.01)
(52) U.S. Cl. ...................................................... 707/781
(58) Field of Classification Search ................ 707/204, 707/781
See application file for complete search history.

(56) References Cited

U.S. PATENT DOCUMENTS

| 6,442,663 | B1 * | 8/2002 | Sun et al. ................... 711/202 |
| 7,240,122 | B2 * | 7/2007 | Sato ............................ 709/232 |
| 7,424,547 | B2 * | 9/2008 | Sato ............................ 709/232 |
| 2003/0065898 | A1 * | 4/2003 | Flamma et al. ............. 711/165 |
| 2003/0110237 | A1 | 6/2003 | Kitamura et al. |
| 2005/0055402 | A1 * | 3/2005 | Sato ............................ 709/205 |
| 2005/0256898 | A1 | 11/2005 | Akagawa et al. |
| 2006/0020636 | A1 | 1/2006 | Murotani |
| 2006/0129654 | A1 * | 6/2006 | Sato ............................ 709/213 |
| 2006/0288048 | A1 * | 12/2006 | Kamohara et al. .......... 707/200 |
| 2007/0079100 | A1 * | 4/2007 | Shiga et al. ................. 711/170 |

FOREIGN PATENT DOCUMENTS

| JP | 2003-173279 | 12/2001 |
| JP | 2005-84963 | 9/2003 |
| JP | 2005-321913 | 5/2004 |
| JP | 2006-39814 | 7/2004 |

* cited by examiner

*Primary Examiner*—Tim T. Vo
*Assistant Examiner*—Gary Koo
(74) *Attorney, Agent, or Firm*—Hitachi America, Ltd.

(57) ABSTRACT

The file sharing system of the present invention selects a suitable data migration method that corresponds with the usage status and transfers data efficiently. A virtual volume and a migration source volume which is the migration target volume are associated by means of an external connection control section. When an instruction for volume migration is issued, the usage percentage judgment section compares the usage percentage of the migration source volume with a designated threshold value. When the usage percentage is equal to or more than the threshold value, volume copying is selected. The volume copy section copies data at the block level from the virtual volume to the migration destination volume. When the usage percentage is less than the threshold value, file copying is selected. The file copy section reads files stored in the migration source volume via the host and writes the files to the migration destination volume.

11 Claims, 22 Drawing Sheets

FIG. 5
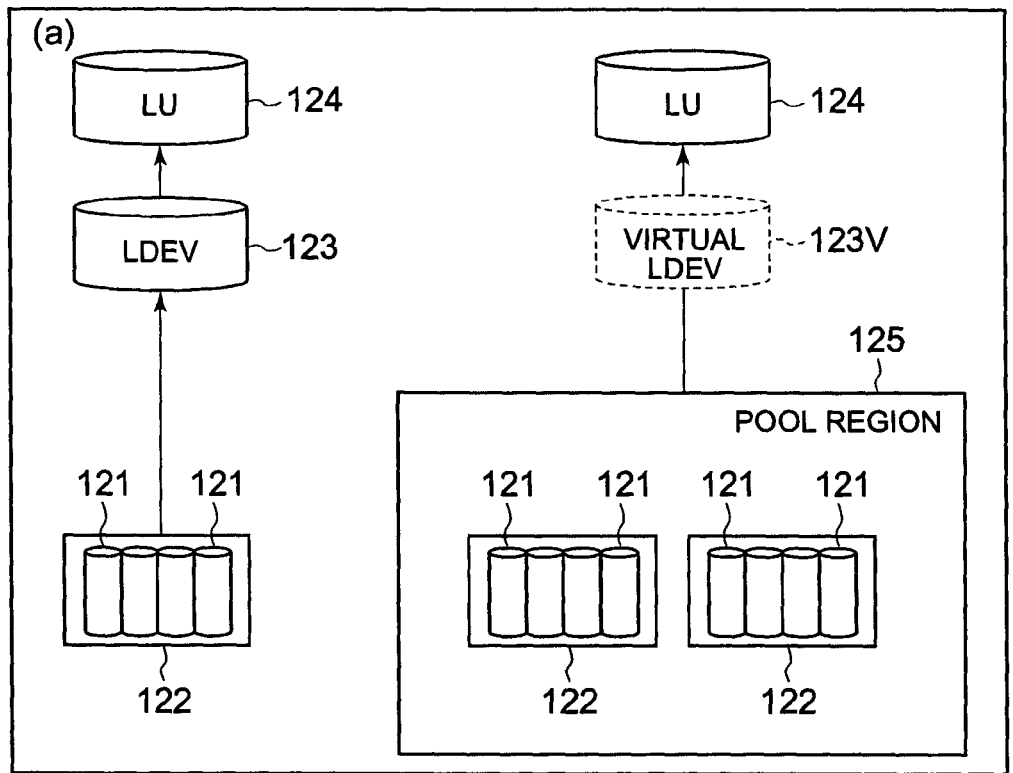
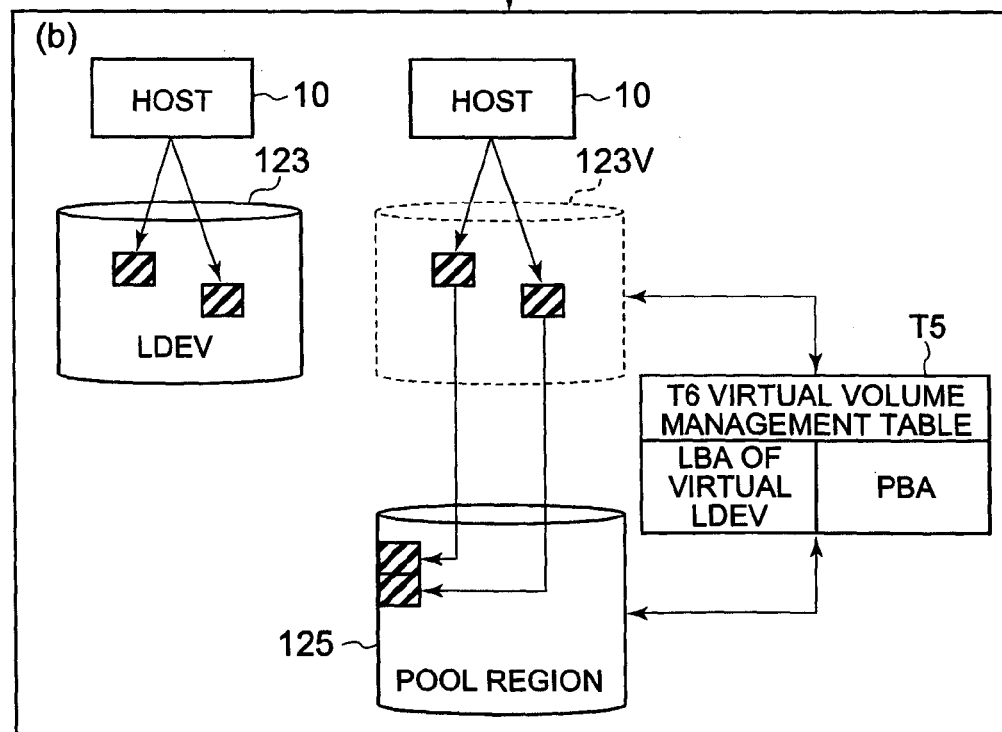

| NAS PORT MANAGEMENT TABLE | | |
|---|---|---|
| PORT NUMBER | IP ADDRESS | MAC ADDRESS |
| 1A-0 | 192.168.0.10 | 00-B0-D0-63-73-B9 |
| 1A-0 | 192.168.0.20 | 00-0B-5D-29-86-6F |
| 1B-0 | 192.168.0.30 | 00-0E-35-00-C4-36 |
| . . . | . . . | . . . |

| NAS VOLUME MANAGEMENT TABLE | | | | | | |
|---|---|---|---|---|---|---|
| VOLUME NUMBER | LUN | FILE SYSTEM | NAS VERSION | SIZE | USAGE PERCENTAGE | VOLUME ATTRIBUTE |
| #0 | #0 | NFS | 500 | 500MB | 70% | EXTERNAL VOLUME |
| #1 | #1 | CIFS | 500 | 200MB | 10% | EXTERNAL VOLUME, AOU TARGET VOLUME |
| #2 | #2 | CIFS | 600 | 300MB | 50% | NORMAL VOLUME |
| #3 | #3 | NFS | 600 | 150MB | 10% | AOU TARGET VOLUME |
| #4 | #4 | NFS | 500 | 500MB | 10% | EXTERNAL VOLUME, AOU TARGET VOLUME |

FIG. 10

| EXTERNAL CONNECTION MANAGEMENT TABLE | | | T4 |
|---|---|---|
| VOLUME NUMBER | STORAGE CONTROL DEVICE NUMBER | LUN |
| #0 | R500-1 | #0 |
| #1 | R500-2 | #1 |
| #4 | R500-1 | #4 |

FIG. 11
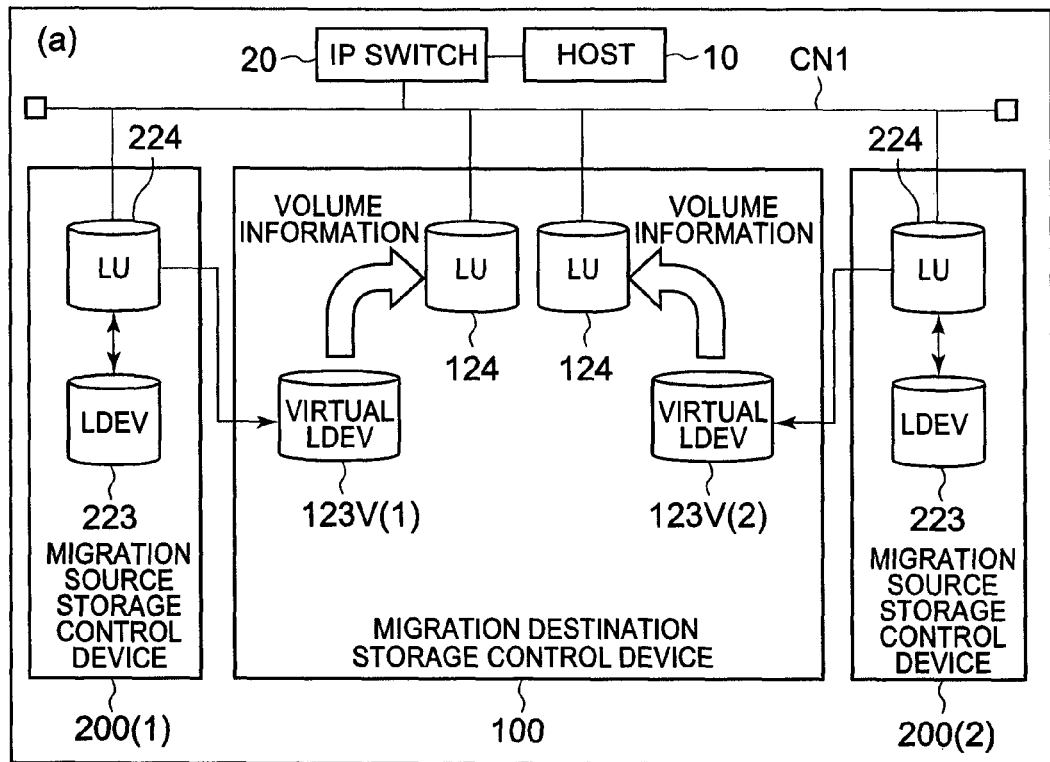
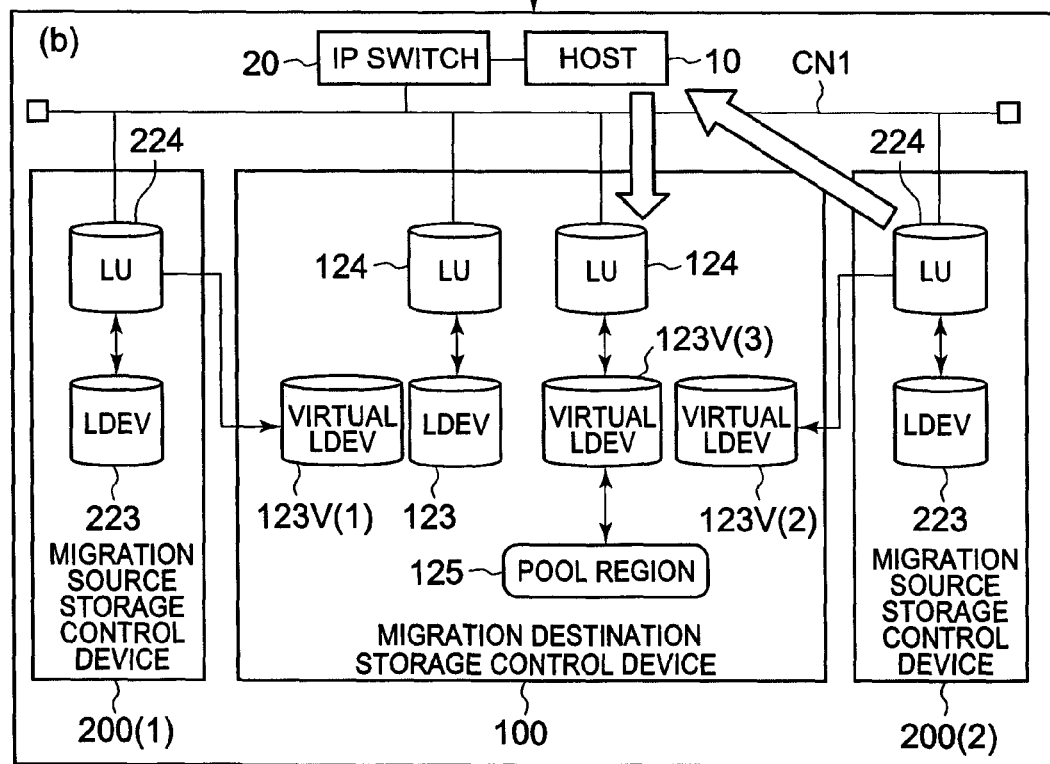

FIG. 16

T2(STORAGE CONTROL DEVICE 200(2))

NAS VOLUME MANAGEMENT TABLE (MIGRATION SOURCE)

| VOLUME NUMBER | LUN | FILE SYSTEM | NAS VERSION | SIZE | USAGE PERCENTAGE | VOLUME ATTRIBUTE |
|---|---|---|---|---|---|---|
| #1 | # | CIFS | 500 | 200MB | 10% | EXTERNAL VOLUME |

T2(STORAGE CONTROL DEVICE 100)

NAS VOLUME MANAGEMENT TABLE (MIGRATION DESTINATION)

| VOLUME NUMBER | LUN | FILE SYSTEM | NAS VERSION | SIZE | USAGE PERCENTAGE | VOLUME ATTRIBUTE |
|---|---|---|---|---|---|---|
| #0 | #0 | NFS | 500 | 500MB | 70% | EXTERNAL VOLUME |
| #1 | # | CIFS | 500 | 200MB | 10% | EXTERNAL VOLUME, AOU TARGET VOLUME |
| #4 | #4 | NFS | 500 | 500MB | 10% | EXTERNAL VOLUME, AOU TARGET VOLUME |

FILE SHARING SYSTEM, FILE SHARING DEVICE AND FILE SHARING VOLUME MIGRATION METHOD

CROSS-REFERENCE TO RELATED APPLICATIONS

This application relates to and claims priority from Japanese Patent Application No. 2006-318892 filed on Nov. 27, 2006, the entire disclosure of which is incorporated herein by reference.

BACKGROUND OF THE INVENTION

1. Field of the Invention

The present invention relates to a file sharing system, a file sharing device, and a method of migrating file sharing volumes.

2. Description of the Related Art

In order to share data between a plurality of computers that are distributed over a network, a file sharing device is employed. As an initial-type of file sharing device, a file server obtained by mounting a file sharing protocol such as CIFS (Common Internet File System) or NFS (Network File System) on a general OS (Operating System) is known. As an enhanced file sharing device, an NAS (Network Attached Storage) that uses a dedicated OS that is specialized for file sharing services and which supports a plurality of file sharing protocols (CIFS, NFS, DAFS (Direct Access File System) or the like).

On the one hand, the number of files to be shared and the number of clients using the shared files is increasing year by year and individual file sizes are also increasing. In order to meet the increase in the demand for such file sharing services, storage devices and communication lines and so forth are augmented or existing file sharing devices are changed to higher performance file sharing devices, example.

As a first conventional technique for performing migration from old file sharing devices to new file sharing devices, a technique according to which a file sharing migration program provided on a new file server is connected at block level to a volume of an old file server and file sharing setting information and volume setting information of the old file server are acquired is known (Japanese Application Laid Open No. 2005-321913). According to this first conventional technique, during the migration, a file access request from the host computer ('host' hereinbelow) is issued to the volume in the old file server on the basis of the file sharing setting information and volume setting information of the old file server thus acquired.

As a second conventional technique, a technique that network-mounts a file sharing system of a migration source NAS20 in a migration source storage region provided in the migration destination NAS and transfers data from the migration source storage region to the migration destination storage region in the migration destination NAS is known (Japanese Application Laid Open No. 2005-084963).

As a third conventional technique, a technique that, after transferring the file tree structure from the migration source NAS to the migration destination NAS, converts the file disk repeater received by the migration destination NAS into a file disk repeater for the migration source NAS in order to read the data from the migration source NAS is known (Japanese Application Laid Open No. 2006-039814).

As a fourth conventional technique, a technique that reads data that has not yet migrated to the migration destination file server from the migration source file server and supplies the data to the host is known (Japanese Application Laid Open No. 2003-173279).

The viewpoint that the data migration method is controlled in accordance with the usage state of the migration target volume is not included in either of the above techniques. Hence, irrespective of the size of the frequency with which the host utilizes the migration target volume, data are transferred by means of the same method. Hence, there is the probability of waste in the migration of the migration target volume.

Furthermore, in each of the conventional techniques, a migration destination volume that stores data of the migration target volume is formed on a specified physical storage device as per a normal volume. Therefore, in each of the conventional techniques, the storage resources of the migration destination file sharing device are consumed irrespective of the size of the frequency of use by the host.

SUMMARY OF THE INVENTION

The present invention was conceived in view of the above problems and an object thereof is to provide a file sharing system capable of selecting a data migration method in accordance with the usage status of the migration-target migration source volume, a file sharing device and a file sharing volume migration method. A further object of the present invention is a file sharing system capable of selecting a data migration method and a migration destination volume generation method, as well as a file sharing device and a file sharing volume migration method in accordance with the usage status of the migration target volume. Further objects of the present invention will become evident from the following embodiments described hereinbelow.

In order to solve the above problem, the file sharing system that transfers a volume from a migration source file sharing device to a migration destination file sharing device according to the present invention comprises a first communication channel for connecting a higher level device, the migration source file sharing device, and the migration destination file sharing device; a second communication channel provided separately from the first communication channel for mutually connecting the migration source file sharing device and the migration destination file sharing device; a migration destination volume generation section for generating a migration destination volume in the migration destination file sharing device; a volume connection section that connects the migration source volume in the migration source file sharing device and the migration destination volume generated by the migration destination volume generation section via the second communication channel and which associates the migration source volume and the migration destination volume; a usage status discrimination section for discriminating the usage status of the migration source volume by comparing the usage percentage in a case where the higher level device uses the migration source volume via the first communication channel and a preset predetermined value; and a data migration section that selects anyone data migration method from among a plurality of pre-prepared data migration methods in accordance with the discrimination result of the usage status discriminated by the usage status discrimination section and uses the selected data migration method to transfer data stored in the migration source volume to the migration destination volume.

According to an aspect of the present invention, the plurality of data migration methods include a first migration method that performs volume copying and a second migration method that performs file copying; and the data migration section selects the first migration method when the usage percentage is equal to or more than the predetermined value and selects the second migration method when the usage percentage is less than the predetermined value.

According to an aspect of the present invention, the first migration method volume-copies data stored in the migration source volume from the migration source volume to the migration destination volume via a first virtual logical storage device which is provided in the migration destination file sharing device such that the migration source volume and the migration destination volume are connected; and the second migration method file-copies data stored in the migration source volume from the migration source volume to the migration destination volume via the higher level device.

According to an aspect of the present invention, the migration destination volume generation section comprises: (1) a first generation method that generates the migration destination volume through association with a predetermined physical storage device in the migration destination file sharing device; and (2) a second generation method that generates the migration destination volume as a virtual volume that is associated with a pool of storage regions of each of a plurality of physical storage devices in the migration destination file sharing device.

According to an aspect of the present invention, the migration destination volume generation section selects the first generation method when the usage percentage is equal to or more than the predetermined value and selects the second generation method when the usage percentage is less than the predetermined value.

According to an aspect of the present invention, the data migration section is constituted such that: (1) the directory structure of the migration source file sharing device is also transferred to the migration destination file sharing device in addition to the data stored in the migration source volume; and (2) when the directory structure and the range of the data transferred from the migration source file sharing device to the migration destination file sharing device do not match, untransferred data that are contained in the directory structure but which have not been transferred from the migration source file sharing device to the migration destination file sharing device are transferred into the migration destination file sharing device via a second virtual logical storage device which is provided in the migration destination file sharing device such that the untransferred volume corresponding to the untransferred data and another migration destination volume are connected.

According to an aspect of the present invention, the first communication channel performs a file-level data transfer and the second communication channel performs a block-level data transfer.

A file sharing device to which a migration source volume of a migration source file sharing device is transferred according to another perspective of the present invention comprises a first communication channel that is connected to a higher level device and the migration source file sharing device and which performs a file-level data transfer; a second communication channel that is provided separately from the first communication channel and connected to the migration source file sharing device and which is for performing block-unit data transfers; and a controller, wherein the controller comprises: a migration destination volume generation section for generating a migration destination volume in the migration destination file sharing device; a volume connection section that connects the migration source volume in the migration source file sharing device and the migration destination volume generated by the migration destination volume generation section via the second communication channel and which associates the migration source volume and the migration destination volume; a usage status discrimination section for discriminating the usage status of the migration source volume by comparing the usage percentage in a case where the higher level device uses the migration source volume via the first communication channel and a preset predetermined value; and a data migration section that selects any one data migration method from among a plurality of pre-prepared data migration methods in accordance with the discrimination result of the usage status discriminated by the usage status discrimination section and uses the selected data migration method to transfer data stored in the migration source volume to the migration destination volume.

A file sharing volume migration method that transfers a file sharing volume from a migration source file sharing device to a migration destination file sharing device according to yet another perspective of the present invention, comprising the steps of: connecting a higher level device, the migration source file sharing device, and the migration destination file sharing device by means of a first communication channel, connecting the migration source file sharing device and the migration destination file sharing device also by means of a second communication channel provided separately from the first communication channel, and connecting the migration destination volume in the migration destination file sharing device and the migration source volume in the migration source file sharing device via the second communication channel and associating the migration source volume and the migration destination volume; handing over address information on the first communication channel related to the migration source volume to the migration destination volume; transmitting information related to the migration source volume from the migration source file sharing device to the migration destination file sharing device and handing over information related to the migration source volume to the migration destination volume; discriminating the usage status of the migration source volume by comparing the usage percentage in a case where the higher level device uses the migration source volume via the first communication channel with a preset predetermined value; volume-copying data stored in the migration source volume to the migration destination volume via the second communication channel when the usage percentage is equal to or more than the predetermined value; and file-copying data stored in the migration source volume to the migration destination volume via the first communication channel when the usage percentage is less than the predetermined value.

The respective parts and at least some of the respective steps of the present invention can sometimes be implemented by a computer program. Such a computer program is stored on a storage device or distributed via a communication network, for example.

BRIEF DESCRIPTION OF THE DRAWINGS

FIG. 5 is an explanatory diagram of an AOU function;

FIG. 7 is an explanatory diagram of a NAS port management table;

FIG. 8 is an explanatory diagram of a NAS volume management table;

FIG. 10 is an explanatory diagram of an external connection management table;

FIG. 11 is an explanatory diagram that schematically shows an aspect of data migration of a volume copy mode and file copy mode;

FIG. 16 is an explanatory diagram like that in FIG. 14;

DESCRIPTION OF THE SPECIFIC EMBODIMENTS

Figure 1:
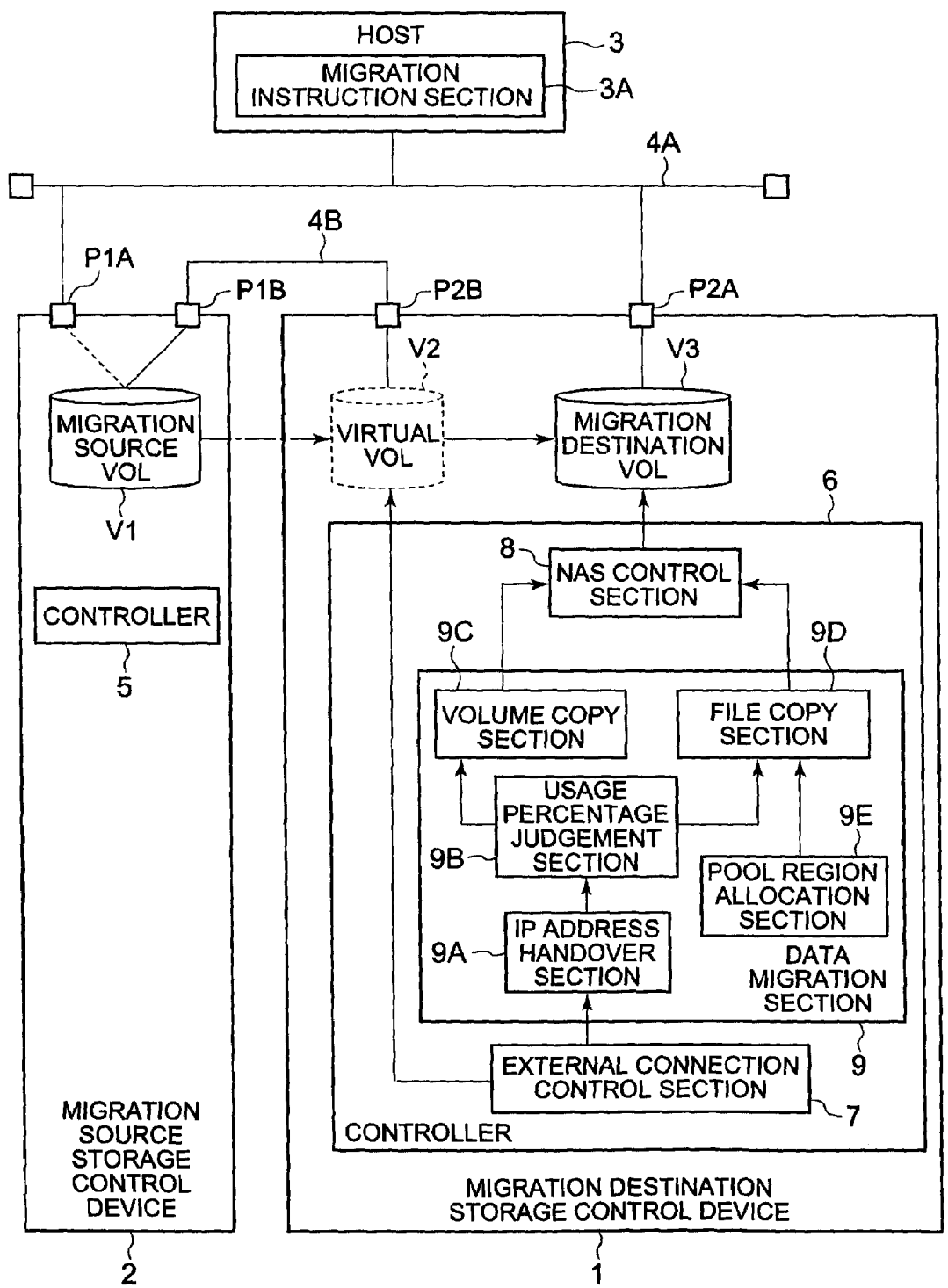
FIG. 1 is an explanatory diagram that provides an overview of the file sharing system of the embodiment of the present invention.

FIG. 1 is an explanatory diagram of an overview of the embodiment of the present invention. The file sharing system shown in FIG. 1 is constituted comprising a plurality of storage control devices 1 and 2 and at least one or more hosts 3, for example.

The host 3 and each of the storage control devices 1 and 2 are mutually connected via a communication channel 4A which is a 'first communication channel'. Communication channel 4A is constituted as a communication network capable of a file unit data transfer such as a LAN (Local Area Network), for example. The respective storage control devices 1 and 2 are also connected by a communication channel 4B which is a 'second communication channel'. The communication channel 4B is constituted as a communication network capable of a block unit data transfer such as a SAN (Storage region Network), for example.

The host 3 will be described first. The host 3 is an example of a 'higher level device' and is constituted as a computer device such as a server computer, for example. A plurality of the host 3 can be provided. However, for the sake of expediency in the description, only one host 3 is illustrated. The host 3 can be provided with a migration instruction section 3A. The migration instruction section 3A is a function that allows the user to instruct where the migration target volume (migration source volume V1) is transferred to, and so forth. The migration instruction section 3A is implemented as a program product that is installed on the host 3 such as NAS management software, for example. Further, the migration instruction section 3A can also be provided in a management terminal 30 (See FIG. 2) shown in the embodiment described subsequently.

The constitution of the storage control devices 1 and 2 will be described next. The storage control device 1 corresponds to the 'migration destination file sharing device' and the storage control device 2 corresponds to the 'migration source file sharing device'. The constitution of the respective storage control devices 1 and 2 may be substantially the same. Therefore, in the following description, the description will focus on the constitution of the storage control device 1.

The migration source storage control device 1 is constituted comprising, for example, a controller 6 and a plurality of volumes V2 and V3. The storage control device 1 is connected to the communication channel 4A via a communication port P2A. The storage control device 1 is connected to the host 3 and migration source storage control device 2 respectively via the communication channel 4A. The storage control device 1 is connected to the communication channel 4B via another communication port P2B.

The migration destination volume V3 is connected to the communication port P2A and the virtual volume V2 that corresponds to a 'first virtual logical storage device' or 'second virtual logical storage device' is connected to the communication port P2B.

Figure 2:
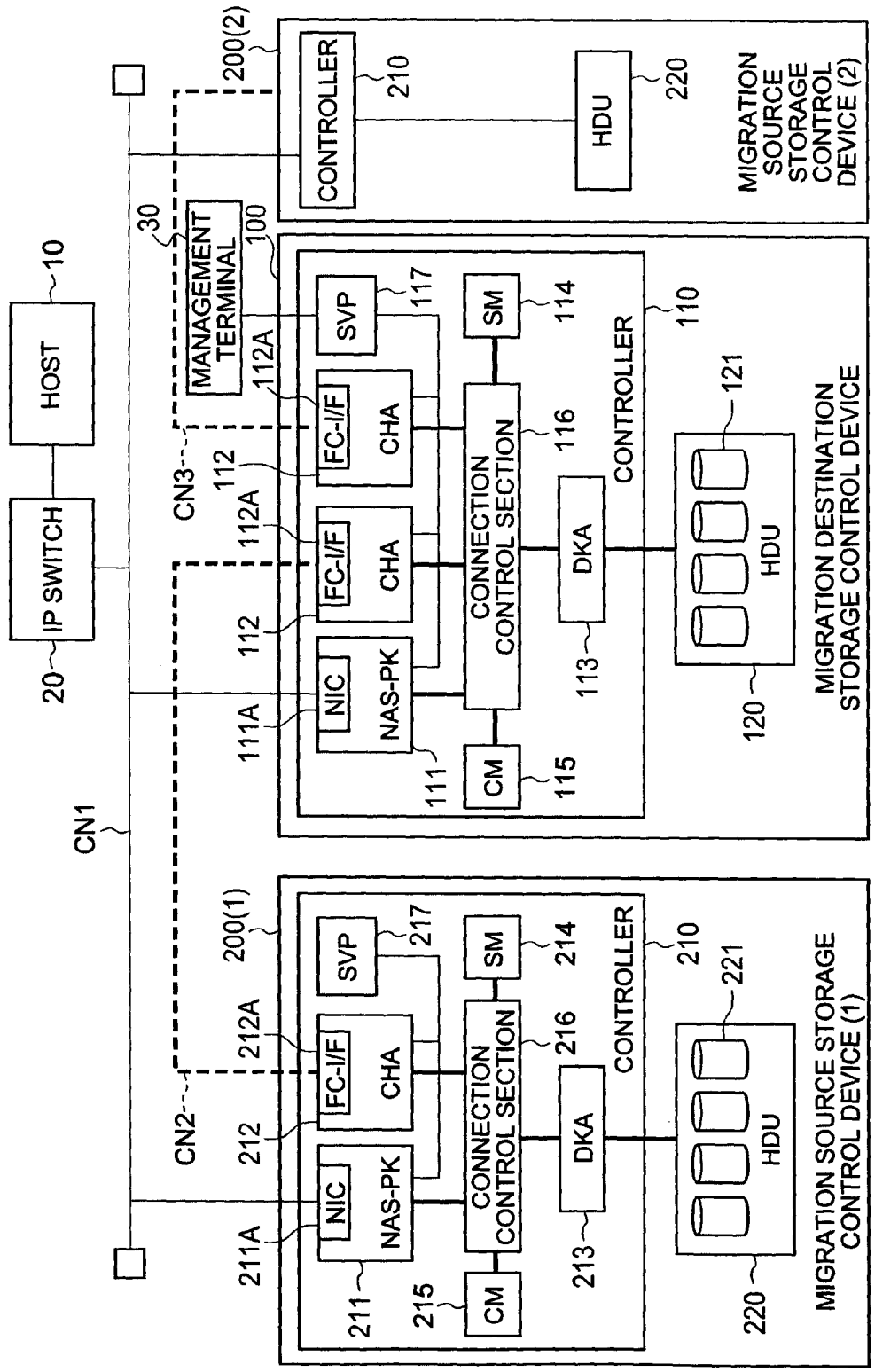
FIG. 2 is a block diagram of the file sharing system.

The storage control device 1 comprises a plurality of disk drives 121 as will become clear from the subsequent embodiments (See FIG. 2). The migration destination volume V3 is generated on the basis of the physical storage region that each of a plurality of disk drives 121 comprise.

Figure 3:
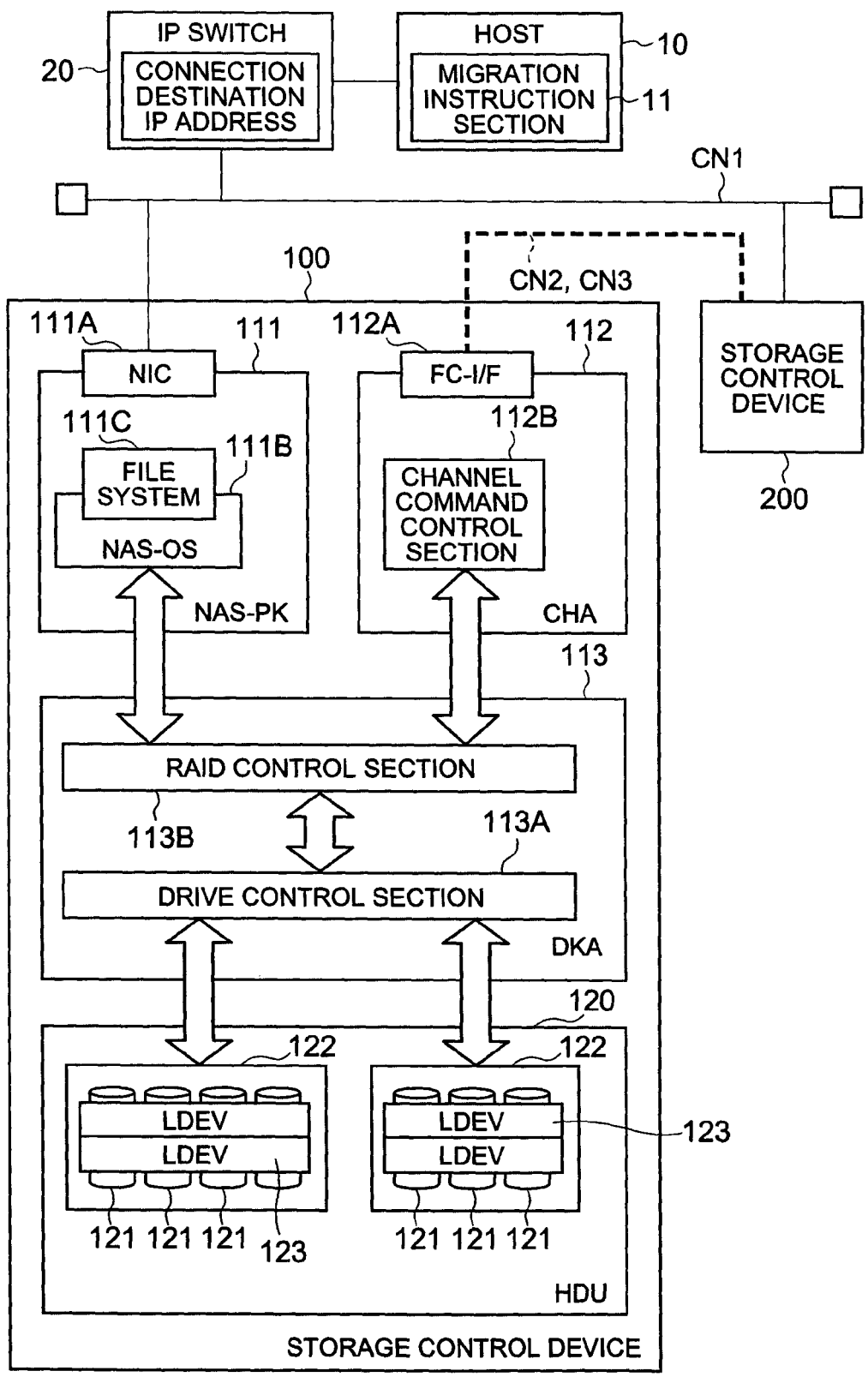
FIG. 3 is an explanatory diagram of the software constitution of a migration source storage control device.

The details will be provided in conjunction with FIG. 3. However, normally, the migration destination volume V3 is provided in one physical storage device (that is, the subsequently described RAID group 122) which is constituted by logically gathering the physical storage regions of the respective disk drives 121. That is, the normal migration destination volume V3 is associated with a specified physical storage device.

In a special case, the migration destination volume V3 is generated as a virtual volume that is associated with a storage region group that is distributed over a plurality of physical storage devices. A plurality of physical storage devices are pooled and the address space of the migration destination volume V3 and the respective storage regions contained in the pool are individually associated in accordance with access requests from the host 3. In other words, when the host 3 write-accesses the migration destination volume V3, one or a plurality of storage regions in the pool are associated with this write-accessed address. The write data received from the host 3 are written to the storage region corresponds to the write address. In other words, the position of the storage region in the pool and the address in the virtual migration destination volume V3 are associated. Thus, by performing virtual construction by associating the migration destination volume V3 with the storage region group in the pool, the migration destination volume V3 can be generated with the required size and the occurrence of wasted storage capacity can be prevented. Further, in the following description, the abovementioned generation of the migration source volume V3 in association with the storage region group in the pool is will be expediently known as AOU (Allocation on use). The term 'AOU' is a word that is used expediently in this specification and does not limit the scope of the present invention.

By providing the communication port P2A connected to the migration destination volume V3 with an IP address and host name and so forth which are related to the migration source volume V1, the host 3 is able to access the migration destination volume V3.

The virtual volume V2 is a volume that is provided virtually in the storage control device 1 in order to associate the migration source volume V1 and the migration destination volume V3. The virtual volume V2 is connected to the migration source volume V1 via the communication port P2B and communication channel 4B. In other words, the virtual volume V2 uses an external volume (migration source volume V1) that exists outside the storage control device 1 as if this external volume were an internal volume of the storage control device 1.

That is, the address spaces in the virtual volume V2 are associated one for one with the address spaces of the migration source volume V1 and access to the virtual volume V2 is converted to access to the migration source volume V1. When data are read from the virtual volume V2, the data are read from the migration source volume V1 and transferred to the storage control device 1 via the communication channel 4B. Further, if data are written to the virtual volume V2, these data are transferred to the storage control device 2 via the communication channel 4B and come to be written to the migration source volume V1.

Thus, virtual volume V2 is used to incorporate the migration source volume V1 which is located outside the storage control device 1 as an internal volume of the storage control device 1. In this embodiment, the act of connecting the external migration source volume V1 to the virtual volume V2 and using the external migration source volume V1 as such is referred to as an 'external connection'. The term 'external connection' is a word that is used expediently in this specification and does not limit the scope of the present invention.

The virtual volume V2 can be utilized as an internal volume of the storage control device 1. Hence, all the data stored in the virtual volume V2 can be copied to the migration destination volume V3 by means of the volume copy function of the storage control device 1 (volume copy section 9C). Such an act of copying the whole of the volume by means of a block-level data transfer is known as a 'volume copy'.

The controller 6 will now be described. The controller 6 controls the overall operation of the storage control device 1. The controller 6 is constituted as a computer device that comprises one or a plurality of processors and memory devices and so forth. A specific example of the controller 6 will become evident in the following embodiment.

If we focus our attention on the functions implemented by the controller 6, the controller 6 comprises an external connection control section 7, a NAS control section 8, and a data migration section 9, for example. The external connection control section 7 is a function that executes processing to generate the virtual volume V2 and associate the migration source volume V1 which exists outside the storage control device 1 and virtual volume V2.

The NAS control section 8 is a function for providing the host 3 with NAS services. In other words, the NAS control section 8 comprises a dedicated OS for performing file sharing and various file sharing protocols, for example. A file level data exchange is then performed with the host 3.

The data migration section 9 is a function for transferring data stored in the migration source volume V1 to the migration destination volume V3. The data migration section 9 comprises, for example, an IP address handover section 9A, a usage percentage judgment section 9B, a volume copy section 9C, a file copy section 9D, and a pool region allocation section 9E.

The IP address handover section 9A sets an IP address or the like that has been set for the migration source volume V1 for the migration destination volume V3. The usage percentage judgment section 9B judges whether the usage percentage of the migration source volume V1 which is the migration target volume exceeds a set predetermined threshold value. The usage percentage denotes the frequency with which the migration source volume V1 is used by the host 3.

The volume copy section 9C copies data at block level from the copy source volume to the copy destination volume. In this embodiment, the copy source volume is the virtual volume V2 and the copy destination volume is the migration destination volume V3.

The file copy section 9D copies data at the file level from the copy source volume to the copy destination volume. In this embodiment, a file copy from the migration source volume V1 to the migration destination volume V3 is performed via the host 3.

Further, a block-level copy or data transfer signifies the copying or transfer of data in block units and a file-level copy or data transfer signifies the copying or transfer of data in file units. In the case of a block-level copy or data transfer, the data are handled as row data irrespective of the significance of the data.

The pool region allocation section 9E implements the abovementioned AOU. In other words, the pool region allocation section 9E virtually generates the migration destination volume V3 by dynamically allocating a multiplicity of pooled storage region groups to the migration destination volume V3 in accordance with an access request from the host 3.

The migration source storage control device 2 will be described next. The migration source storage control device 2 can be constituted as per the migration destination storage control device 1. The migration source storage control device 2 comprises, for example, a controller 5 and a migration source volume V1. The controller 5 comprises a function that controls the overall operation of the storage control device 2 and corresponds to at least the NAS control section 8. In this embodiment, because control of the volume migration is performed by the migration destination storage control device 1, the controller 5 does not comprise a data migration section.

Further, the constitution may be such that, when control of the volume migration is executed such that this control is shared by both the migration destination storage control device 1 and also the migration source storage control device 2, some of the various functions mentioned in the description of the data migration section 9 are implemented by the migration source storage control device 2.

The migration source volume V1 is connected to the communication channel 4A via the communication port P1A and also connected to the communication channel 4B via a communication port P1B. Prior to the start of the volume migration, the host 3 accesses the migration source volume V1 via the communication channel 4A and performs file reading and writing. In the course of the volume migration, access by the host 3 is suspended. After volume migration is complete, the host 3 accesses the migration destination volume V3 via the communication channel 4A.

Further, during the volume migration, access requests issued by the host 3 can be processed. In other words, a volume can also be transferred from the migration source storage control device 2 to the migration destination storage control device 1 without stopping the issue of access requests by the host 3. In this case, the constitution may be such that the stage of completion regarding the extent to which volume copying from the migration source volume V1 to the migration destination volume V3 has been completed, for example, is managed, and the volume to which data are read or written is switched to either V1 or V2 in accordance with the stage of completion.

The operation of the file sharing system of this embodiment will be described next. The user uses the external connection control section 7 to generate the virtual volume V2 in the migration destination storage control device 1 and associate the migration source volume V1 which is the migration target volume with the virtual volume V2.

The user instructs the controller 6 to perform migration of volume V1. The usage percentage judgment section 9B compares the usage percentage of the migration source volume V1 with a predetermined threshold value that has been designated by the user. When the usage percentage is equal to or more than the predetermined threshold value, volume copy is selected. The volume copy section 9C executes a volume copy by taking the virtual volume V2 as the copy source and the migration destination volume V3 as the copy destination. As a result, data that are read via the communication channel 4B from the migration source volume V1 are written to the migration destination volume V3.

When the usage percentage is less than the predetermined threshold value, file copy is selected. The file copy section 9D reads files stored in the migration source volume V1 via the host 3 and writes these files to the migration destination volume V3.

When the usage percentage is less than the predetermined threshold value, the migration destination volume V3 is constituted as a virtual volume that is associated with an in-pool storage region group. As a result, the migration destination volume V3 must be of the minimum size.

When the usage percentage is equal to or more than the predetermined threshold value, the migration destination volume V3 is related with a specified physical storage device as per a normal volume.

Further, when data are transferred from the migration source volume V1 to the migration destination volume V3, the directory structure managed by the NAS control section of the migration source storage control device 2 is handed over to the NAS control section 8 of the migration destination storage control device 1. Hence, when all the volumes associated with the directory structure of the migration source storage control device 2 are transferred to the migration destination storage control device 1, the transferred directory structure matches the range of the transferred data. On the other hand, when only some of the volumes among the plurality of NAS related volumes of the migration source storage control device 2 are transferred to the migration destination storage control device 1, the transferred directory structure and the range of the transferred data do not match.

Hence, in this case, a volume that has not been designated as a migration target among the plurality of volumes of the migration source storage control device 2 is supplied to the migration destination storage control device 1 by using an external connection function. In other words, the migration destination storage control device 1 reads and writes data to volumes that have not been transferred via virtual volumes associated with volumes that have not been transferred. This constitution will become clear in the following embodiment.

This embodiment with this constitution affords the following effects. According to this embodiment, one data migration method among a plurality of pre-prepared data migration methods is selected in accordance with the usage status of the migration target volume V1 and the migration target volume V1 is transferred by using the selected data migration method. Hence, a volume can be transferred by using a more suitable data migration method and user convenience improves.

In this embodiment, when the usage percentage of the migration target volume V1 is equal to or more than a predetermined threshold value, data are transferred by using volume copying and, when the usage percentage is less than the predetermined threshold value, data are transferred by using file copying. Here, when the usage percentage is equal to or more than the predetermined threshold value, the data amount of the migration target is relatively large and, when the usage percentage is less than the predetermined threshold value, the data amount of the migration target can be considered as being relatively small. Hence, in this embodiment, consequently, when the data to be transferred is large, volume copying is selected and, when the data amount to be transferred is small, file copying is selected.

Further, when volume copying is performed, the communication channel 4B that directly connects the respective storage control devices 1 and 2 is used. Hence, according to this embodiment, even when the data amount of the transfer target is large, block level data can be transferred without affecting the communication channel 4A that is used by the host 3. In other words, data can be transferred relatively rapidly without increasing the communication load of the communication channel 4A that allows the host 3 to utilize the storage control devices 1 and 2 and user convenience improves.

When file copying is performed, the host 3 reads data in file units from the migration source volume V1 via the communication channel 4A and writes the data to the migration destination volume V3. Hence, the communication load of the communication channel 4A increases a little. However, when data is transferred by using volume copying, all the management information related to the migration target volume V1 is transferred. Hence, the smaller the data amount of the migration target, the more the proportion of the management information occupying the transferred data increases and the transfer efficiency drops. In this embodiment, when data is considered small, file copying is used and, hence, management information related to the migration target volume V1 need not be transferred and data can be efficiently transferred.

In this embodiment, when the usage percentage is less than a predetermined threshold value, the migration destination volume V3 is generated virtually by using the pooled storage region group. Hence, the migration destination volume V3 can be generated with a size that corresponds with the data amount of the migration target. As a result, the storage resources of the migration destination storage control device 1 can be efficiently used and the operating costs of the file sharing system can be reduced. Examples of the present invention will be described in detail hereinbelow.

EXAMPLE

FIG. 2 is a block diagram showing an overview of a file sharing system. This system comprises, for example, at least one or more hosts 10, at least one or more IP switches 20, and a plurality of storage control devices 100, 200(1), and 200(2).

The relationship with the conceptual diagram shown in FIG. 1 will be described next. The host 10 corresponds to the host 3 in FIG. 1; the migration destination storage control device 100 corresponds to the migration destination storage control device 1 in FIG. 1; the migration source storage control devices 200(1) and 200(2) correspond to the migration source storage control device 2 in FIG. 1; first communication channel CN1 corresponds to the communication channel 4A in FIG. 1, second communication channels CN2 and CN3 correspond to the communication channel 4B in FIG. 1. The controller 110 corresponds to the controller 6 in FIG. 1 and the controller 210 corresponds to the controller 5 in FIG. 1.

The host 10 is constituted as a computer device such as a server computer, for example, and is connected to communication channel CN1 via the IP switch 20. The IP switch 20 is a switch device for connecting the storage control device that comprises the set IP address and the host 10 via a communication channel CN1. The communication channel CN1 is constituted as a communication network that can utilize the TCP/IP (Transmission Control Protocol/Internet Protocol) such as a LAN or the Internet, for example.

The storage control devices 100, 200(1), and 200(2) will now be described. Further, in the following description, when there is no need for a distinction, the storage control device 200(1) and storage control device 200(2) are sometimes called the storage control devices 200. The storage control devices 100, 200(1) and 200(2) can comprise the same basic structure. Therefore, the focus of the description will be on the constitution of the storage control device 100.

The storage control device 100 constitutes the migration destination storage control device to which the migration target volume is transferred in the file sharing system of this example. The storage control device 100 is generally classified as the controller 110 and a disk drive unit ('HDU' hereinbelow) 120, for example.

The controller 110 controls the overall operation of the storage control device 100. The controller 110 can comprise, for example, a NAS package (denoted as 'NAS-PK' in FIG. 2) 111, a plurality of channel adapters ('CHA' hereinbelow) 112, a plurality of disk adapters ('DKA' hereinbelow) 113, shared memory (displayed as 'SM' in FIG. 2) 114, a cache memory (displayed as 'CM' in FIG. 2) 115, a connection control section 116, and a service processor ('SVP' hereinbelow) 117.

The NAS package 111 is a computer device for implementing a NAS function. In other words, the NAS package 111 is constituted by one or a plurality of substrates that have a processor and memory and so forth installed thereon, for example. The memory stores a NAS-OS and a file sharing protocol and so forth. The NAS package 111 comprises at least one or more NIC (Network Interface Card) 111A. The NIC 111A comprises a function for the assembly and disassembly of packets based on the TCP/IP protocol, for example. The NAS package 111 communicates with the communication channel CN1 via the NIC 111A. The NAS package 111 receives a file-level access request from the host 10 via the communication channel CN1 and transmits the processing result of the access request to the host 10 via the communication channel CN1.

The CHA 112 is a computer device that communicates based on FCP (Fibre channel Protocol), for example. The CHA 112 is constituted by one or a plurality of substrates on which a processor and memory and so forth are mounted, for example. This memory stores a program or the like for analyzing and executing FCP-based commands. The CHA 112 comprises at least one or more Fibre channel interfaces (displayed as 'FC-I/F' in FIG. 2) 112A. The Fibre channel interface 112A is also known as an HBA (Host Bus Adapter), for example. Therefore, in the following description, the Fibre channel interface 112A is sometimes referred to as the 'HBA 112A'. A WWN (World Wide Name) is set for the HBA 112A.

As a result of the WWN designation, the CHA 112 is able to communicate with the specified target or an initiator.

In this embodiment, because the migration destination storage control device 100 has a constitution that plays a leading part in the volume migration, the CHA 112 of the migration destination storage control device 100 constitutes an initiator and the CHA 212 of each of the migration source storage control devices 200 constitute targets. In FIG. 2, the migration destination storage control device 100 associate each of the CHA 112 with each of the migration source storage control devices 200(1) and 200(2). The CHA 112 shown on the left side of FIG. 2 is connected to the controller 210 of the first migration source storage control device 200(1) via the communication channel CN2 and the CHA 112 shown on the right side of FIG. 2 are connected to the second migration source storage control device 200(2) via the communication channel CN3. The communication channels CN2 and CN3 are constituted as fibre channels.

Further, although connections are shown as Peer-to-Peer connections in FIG. 2, connections are not limited to such a connection and may also be fabric connections using fibre channel switches. In FIG. 2, one each of the CHA 112 is associated with one each of the migration source storage control devices 200(1) and 200(2). The configuration is not limited to such an arrangement, however. The respective communication between the respective migration source storage control devices 200(1) and 200(2) can also be carried out by one CHA 112.

A DKA 113 exchanges data with the disk drive 121 that the HDU 120 comprises. The DKA 113 is constituted as a computer device that comprises a processor and memory or the like as per the CHA 112. In FIG. only one DKA 113 is shown for the sake of expedience but a plurality of DKA 113 are actually provided.

The DKA 113 is connected to the respective disk drives 121 in the HDU 120 via a fibre channel. The DKA 113 writes data received by the respective NAS package 111 or CHA 112 and stored in the cache memory 115 to a predetermined address in a predetermined disk drive 121. Furthermore, the DKA 113 reads data requested by the NAS package 111 or respective CHA 112 from the predetermined disk drive 121 and stores the data in the cache memory 115.

The DKA 113 converts a logical address into a physical address. A logical address is an address denoting the block position in a logical volume and is known as an LBA (Logical Block Address). A physical address is an address that denotes a write position in the disk drives 121. When the disk drives 121 are managed in accordance with RAID, the DKA 113 performs data access in accordance with a RAID configuration. For example, the DKA 113 writes the same data to each of the plurality of disk drives 121 (RAID1) or distributes and writes data and parities between/to a plurality of disk drives 121 by executing parity computation (RAID5 or the like).

The shared memory 114 is a memory for storing various management information and control information that is used to control the operation of the storage control device 100. The cache memory 115 is memory for storing data received by the NAS package 111 or CHA 112 or for storing data read from the disk drives 121 by the DKA 113.

Any one or a plurality of the disk drives 121 may be used as a cache disk. As is illustrated, the cache memory 115 and shared memory 114 may be constituted as separate memories. Some of the storage regions of the same memory may be used as a cache area and another storage region may be used as a control area.

A storage control section 116 mutually connects the NAS package 111, CHA 112, DKA 113, cache memory 115, and shared memory 114. The storage control section 116 is constituted as a crossbar switch or the like that transmits data by means of a high-speed switching operation, for example.

The SVP 117 is connected to the NAS package 111 and CHA 112 via a communication network such as a LAN, for example. The SVP 117 can also access the DKA 113, cache memory 115, and shared memory 114 via the CHA 112, for example. The SVP 117 collects information related to the various states in the storage control device 100 and supplies this information to the management terminal 30. The user is able to find out the various states of the storage control device 100 via the screen of a management terminal 30.

The user is able to set the access channel between the host 10 and a logical volume via the SVP 117 from the management terminal 30 and set the access channel between the migration destination storage control device 100 and the respective migration source storage control devices 200. Furthermore, the user is also able to supply an instruction related to volume migration to the migration destination storage control device 100 by using the management terminal 30.

The HDU 120 comprises a plurality of disk drives 121. Although the storage devices are referred to as disk drives in this specification for the sake of expediency in the description, the present invention is not limited to storage devices that cause a disk-like storage medium to rotate. For example, a variety of storage devices such as hard disk drives, flexible disk drives, magnetic tape drives, semiconductor memory drives (including flash memory devices), optical disk drives, and holographic memory and equivalents thereof can be used. Further, different types of disks such as FC (Fibre Channel) disks, SATA (Serial AT Attachment) disks and ATA disks, for example, can also be mixed together in the HDU 120.

As shown in FIG. 3, one RAID group (also known as a 'parity group') 122 is formed by a plurality of disk drives 121. RAID group 122 is produced by virtualizing physical storage regions of the respective disk drives 121 in accordance with the RAID level and corresponds to a 'physical storage device'. One or a plurality of logical devices 123 of a predetermined size or arbitrary size can be provided in a physical storage region of the RAID group 122. The logical devices 123 are displayed as 'LDEV' in FIG. 3.

Let us now return to FIG. 2. The migration source storage control device 200 (1) comprises a controller 210 and HDU 220 similarly to the migration destination storage control device 100. The controller 210 comprises a NAS package 211, a CHA 212, a DKA 213, a shared memory 214, a cache memory 215, a connection control section 216, and an SVP 217.

The NAS package 211 is connected to the communication channel CN1 via an NIC 211A and the CHA 212 is connected to the communication channel CN2 via a fibre channel interface 212A. Further, although not illustrated here, the management terminal 30 can also be connected to the SVP 217.

The HDU 220 comprises a plurality of disk drives 221 and, as described for the HDU 120 of the migration destination storage control device 100, the physical storage regions of each of the disk drives 221 are grouped to constitute a RAID group 222 (See FIG. 4) and a logical device 223 is provided in the RAID group 222.

Thus, the respective storage control devices 100 and 200 can be constituted in a form in which a NAS function is added to each disk array system. The respective storage control devices 100 and 200 can provide file sharing services to the host 10 by means of the NAS package 111 and 211. Further, each of the storage control devices 100 and 200 also comprise a SAN storage function.

Further, the constitution of the respective storage control devices 100 and 200 is an example and the present invention is not limited to the above constitution. For example, a more compact controller can also be constituted by providing one or a plurality of control substrates with a NAS function, CHA function, DKA function, and cache function and so forth. Further, the HDU 120 and 220 need not be provided in the same enclosure as the controllers 110 and 210 and may be constituted provided in separate enclosures.

FIG. 3 is an explanatory diagram that focuses on the software constitution of the file sharing system. In FIG. 3, for the sake of expediency, only one migration source storage control device 200 of the plurality of migration source storage control devices 200 is displayed.

A migration instruction section 11 can be provided in the host 10. The migration instruction section 11 is a function for designating a migration target volume and a migration destination and so forth. The migration target volume signifies the volume to be transferred from the migration source storage control device 200 to the migration destination storage control device 100 among the volumes that are used for the file sharing services. In the following description, in order to make a distinction from the other volumes, a volume that is managed by the NAS package is sometimes referred to as a NAS volume. Further, as mentioned earlier, the constitution may be such that the migration instruction section 11 is provided in the management terminal 30.

The IP switch 20 is provided with a connection destination IP address or the like. The host 10 is able to access a storage control device with the IP address that has been set for the IP switch 20.

The NAS package 111 is provided with a NAS-OS 111B and a file system 111C. The CHA 112 is provided with a channel command control section 112B for processing various commands that are based on the Fibre channel protocol.

The DKA 113 is provided with a drive control section 113A and a RAID control section 113B. The drive control section 113A accesses the disk drive 121 in accordance with a request from the RAID control section 113B and also reads and writes data. The RAID control section 113B constitutes a RAID group 122 from a plurality of disk drives 121 and establishes a logical device 123 in the RAID group 122.

Figure 4:
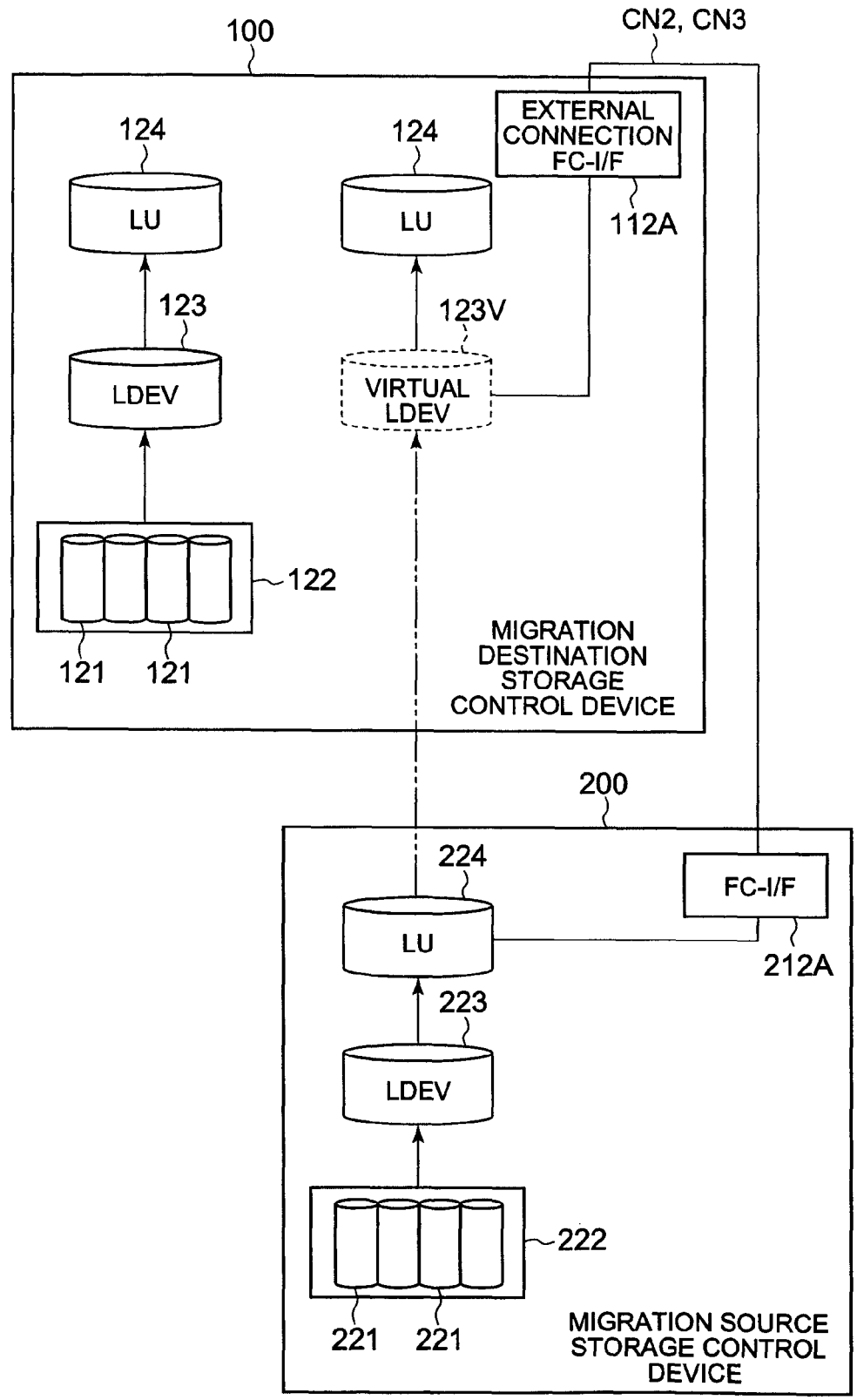
FIG. 4 is an explanatory diagram of an external connection function.

FIG. 4 is an explanatory diagram that serves to illustrate an external connection function. The migration destination storage control device 100 comprises an external connection function. The external connection function is a function that incorporates a volume 224 that exists outside the migration destination storage control device 100 in the migration destination storage control device 100 in order to be able to use the external volume 224 as if same were a volume that existed in the migration destination storage control device 100.

As shown on the left at the top of FIG. 4, in the case of a normal logical volume (LU: Logical Unit) 124, a logical device 123 that is based on the disk drives 121 that the migration destination storage control device 100 comprises is associated with the normal logical volume 124. In other words, the logical volume 124 is associated with a physical storage device (RAID group 122) in the migration destination storage control device 100. More precisely, the logical volume 124 is connected to a logical device 123 that is established in the RAID group 122 in the migration destination storage control device 100. Hence, write data for which the logical volume 124 is the write destination comes to be written to the logical device in the migration destination storage control device 100.

Likewise, as shown at the bottom in FIG. 4, so too with the migration source storage control device 200, the logical volume 224 is associated with the logical device 223 established in the physical storage device (RAID group 222) in the migration source storage control device 200.

As shown on the right at the top of FIG. 4, another logical volume 124 in the migration destination storage control device 100 is associated with the logical volume 224 in the migration source storage control device 200 via a virtual logical device 123V.

The virtual logical device 123V is provided in the storage region of the cache memory 115, for example and acts as a bridge between the other logical volume 124 and a logical volume that exists outside (also known as an external volume) 224. In other words, the storage spaces of the virtual logical device 123V and the storage spaces of the external logical device 223 correspond one-to-one. Write data for which the other logical volume 124 is the write destination are transferred to the external volume 224 via the communication channels CN2 and CN3 and then written to the logical device 223. When data are read from another logical volume 124, data are read from the logical device 223 and data are transferred from the migration source storage control device 200 to the migration destination storage control device 100. Thus, by mapping the logical volume 224 in the migration source storage control device 200 with the virtual logical device 123V in the migration destination storage control device 100, the migration destination storage control device 100 is able to use the external logical volume 224 as if same were its own internal volume.

FIG. 5 is an explanatory diagram that serves to illustrate the AOU function. The AOU function is a function that uses each of the storage regions of the pooled plurality of RAID groups 122 to virtually construct the logical volume 124.

As shown on the right hand side of FIG. 5A, a plurality of RAID groups 122 are pooled beforehand in a pool region 125 and the logical device 123V is constructed virtually by the storage region group in the pool region 125 (block group, for example).

The virtual logical device 123V shown in FIG. 5 differs from the virtual logical device 123V illustrated in FIG. 4. The virtual logical device 123V shown in FIG. 4 is provided for the purpose of the external connection function and the virtual logical device 123V shown in FIG. 5 is provided for the purpose of the AOU function.

As shown in FIG. 5B, when the host 10 requests writing to the virtual logical device 123V, the storage regions accessed in the logical device 123V and the storage regions in the pool region 125 are associated. Further, the write data received by the host 10 are written to the corresponding storage regions in the pool region 125. The relationship between the storage space of the virtual logical device 123V and the storage region group in the pool region 125 is managed by the virtual volume management table T5. Table T5 associates and manages logical addresses in the virtual logical device 123V and addresses (PBA) of the disk drives 121 in which the data are actually stored, for example. In other words, by using the AOU function, a storage region of the required size can be taken and used when required from the storage region group pooled in the pool region 125. Hence, a logical volume 124 of a size that is suitable for storing the migration target data can be generated and the storage resources of the migration destination storage control device 100 are not wastefully consumed.

Figure 6:
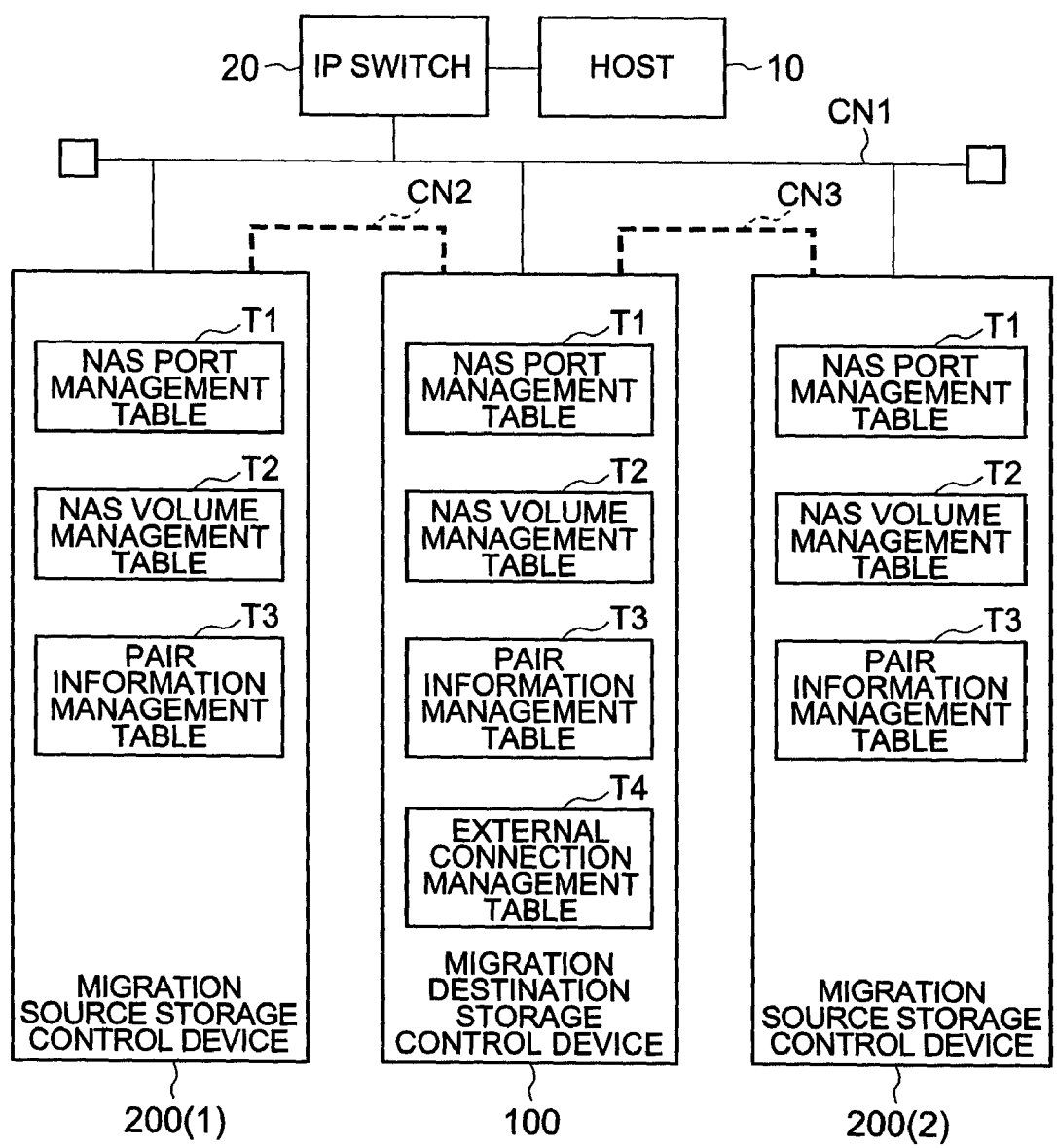
FIG. 6 is an explanatory diagram of a management table disposition destination.

FIG. 6 is an explanatory diagram showing the tables managed by the respective storage control devices 100 and 200. The migration destination storage control device 100 comprises, for example, a NAS port management table T1, a NAS volume management table T2, a pair information management table T3, and an external connection management table T4. Further, when the AOU function is used, the migration destination storage control device 100 also comprises the virtual volume management table T5 above.

The respective migration source storage control devices 200 can comprise, for example, the NAS port management table T1, NAS volume management table T2, and pair information management table T3. Because the external connection function is executed by the migration destination storage control device 100, the respective migration source storage control devices 200 do not comprise the external connection management table T4. Hereinbelow, Examples of each of the Tables T1 to T4 will be described with an emphasis on the migration destination storage control device 100.

FIG. 7 is an explanatory diagram showing an example of the NAS port management table T1. The NAS port management table T1 manages the respective communication ports 111A of the NAS package 111. This table T1 associates and manages the port number, IP address, and MAC (Media Access Control Address), for example.

FIG. 8 is an explanatory diagram showing an example of the NAS volume management table T2. The NAS volume management table T2 is a table for managing the logical volume 124 that is managed by the NAS-OS 111B. The NAS volume management table T2 associates and manages, for example, the volume number, LUN (Logical Unit Number), file system name (abbreviated as 'file system' in FIG. 8), NAS version, size, usage percentage, and volume attribute.

The volume number is information for identifying each of the logical volumes 124 in the migration destination storage control device 100. The LUN is identification information that is established for each logical volume. The file system name is information denoting the type of file system that utilizes the logical volume 124. The NAS version is information indicating the version of the NAS-OS 111B that manages the logical volume 124. The size is information indicating the storage capacity of the logical volume 124.

The usage percentage is information indicating the frequency with which the logical volume 124 is utilized by the host 10 and indicates the percentage of usage by the host 10 by means of a percentage. A higher value of the usage percentage signifies that the logical volume 124 is used frequently by the host 10.

The volume attribute is information relating to the attribute of the logical volume 124. Attributes can include 'external volume', 'normal volume', 'AOU target volume' and so forth. 'External volume' is an attribute that signifies the fact that the logical volume 124 is associated with the logical volume 224 that exists outside the migration destination storage control device 100. 'Normal volume' is an attribute that signifies the fact that the logical volume 124 is associated with the logical device 123 inside the migration destination storage control device 100. 'AOU target volume' is an attribute that signifies the fact that the logical volume 124 is generated using the AOU function.

Figure 9:
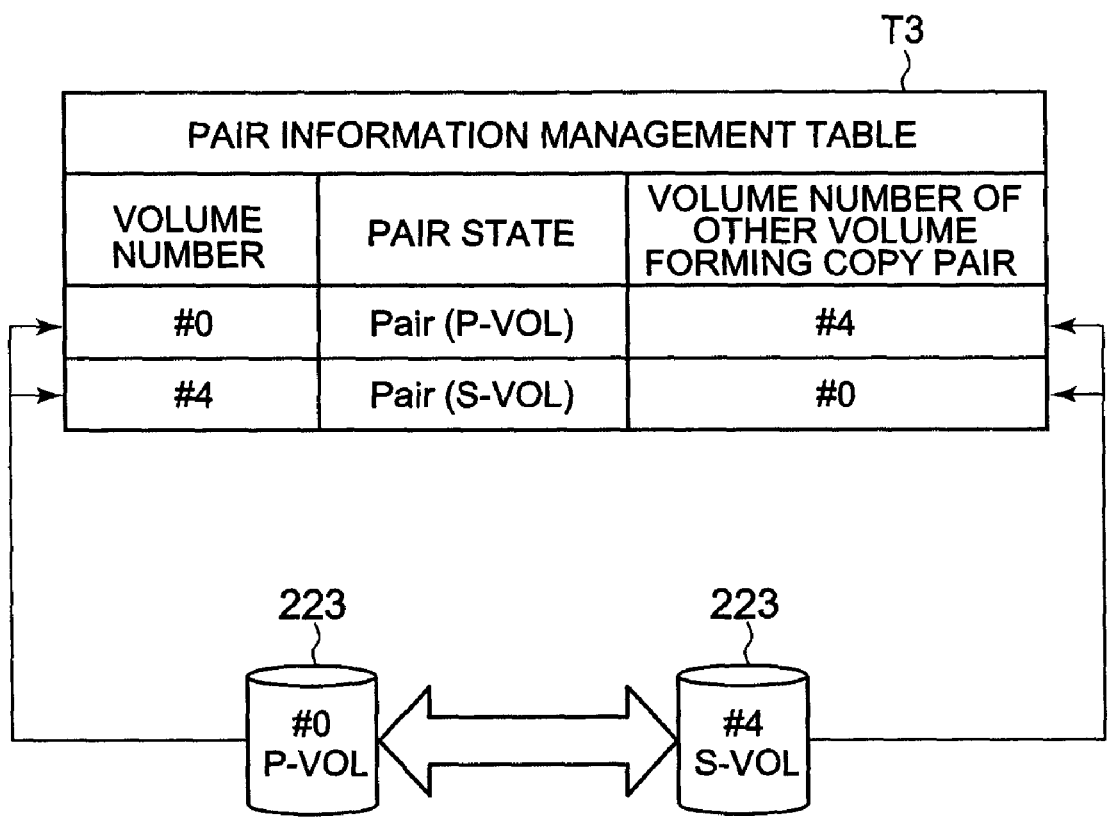
FIG. 9 is an explanatory diagram of a pair information management table.

FIG. 9 is an explanatory diagram showing an example of the pair information management table T3. The pair information management table T3 is a table for managing a copy pair. The pair information management table T3 associates and manages, for example, the volume number, pair state, and the volume number of the other volume forming copy pair.

'Pair state' is information indicating the state of a copy pair. Copy pair state scan include, for example, 'pair', which indicates that the copy pair is being formed, 'split', which indicates that the copy pair has been canceled, and 'resync', which matches the stored content of a primary volume with the stored content of a secondary volume. 'P-VOL' shown in FIG. 9 indicates the fact that the volume in question is the copy source logical volume (primary volume) and 'S-VOL' indicates the fact that the volume in question is the copy destination logical volume (secondary volume).

FIG. 10 is an explanatory diagram that shows the external connection management table T4. The external connection management table T4 is a table for managing the logical volumes connected by using the external connection function.

The external connection management table T4 associates and manages, for example, the volume number, the storage control device number, and the LUN. The number of the logical volume 124 associated with the external volume 224 is set as the volume number. The storage control device number is information serving to identify the migration source storage control device 200 that comprises the external volume 224. The LUN is the LUN associated with the external volume 224.

FIG. 11 is an explanatory diagram that schematically shows an aspect of the data migration by the file sharing system of this embodiment. As shown in FIG. 11A, the user externally connects the migration source volume 224 to the virtual logical device 123V in the migration destination storage control device 100 beforehand, prior to the start of data migration. Further, when the user instructs the migration destination storage control device 100 to commence data migration by designating the migration target volume or the like, the volume information of the migration source volume 224 which is a migration target volume is handed over to the migration destination volume 124. The volume information can also include information on the directory structure managed by the NAS-OS in the migration source storage control device 200.

FIG. 11B shows data migration methods of a plurality of types. The first data migration method is a data migration method using the volume copy shown on the left hand side of FIG. 11B. This data migration method can also be called 'volume copy mode', for example. In volume copy mode, data stored in the migration source volume 224 are copied to the logical device 123 related to the migration destination volume 124 via a virtual logical device 123V (1). In other words, volume copying is performed between the virtual logical device 123V (1) that exists in the migration destination storage control device 100 and the logical device 123 connected to the migration destination volume 124.

Because the virtual logical device 123V (1) and the migration source volume 224 are externally connected, by performing volume copying between the virtual logical device 123V (1) and the logical device 123, data stored in the migration source volume 224 are transferred to the migration destination storage control device 100 via the communication channel CN2 and stored in the migration destination volume 124. The communication channel CN2 is separate from the communication channel CN1 that the host 10 uses for file access, the volume copying does not affect the communication channel CN1. Hence, even when there is a large amount of migration target data, data can be transferred without bringing about an increase in the amount of communication of the communication channel CN1. Furthermore, in volume copying, because a block-level data transfer is effected on the basis of a fibre channel pool, the time required for the data migration can also be made relatively short.

The second data migration method of this embodiment is a data migration method using the file copying shown on the right hand side of FIG. 11B. This data migration method can also be called file copy mode. In file copy mode, the data stored in the migration source volume 224 are read by the host 10 in file units and written to the migration destination volume 124. Furthermore, in file copy mode, the logical device 123V (3) connected to the migration destination volume 124 is generated virtually from the storage area group stored in the pool region 125.

File copy mode is selected when the usage percentage of the migration target volume 224 is lower than a predetermined threshold value. The volume copy mode above is selected when the usage percentage of the migration target volume 224 is equal to or more than the predetermined threshold value. When the usage percentage of the migration target volume 224 is low, the data amount of the migration target can also be considered small. Hence, the communication channel CN1 is used to execute file copying and the load supplied to the communication channel CN1 can be considered relatively small. As a result, when the usage percentage is equal to or more than the predetermined threshold value, the data amount of the migration target can also be considered large. Hence, the other communication channel CN2 that is separate from the communication channel CN1 is used and data transfers are made at block level.

Figure 12:
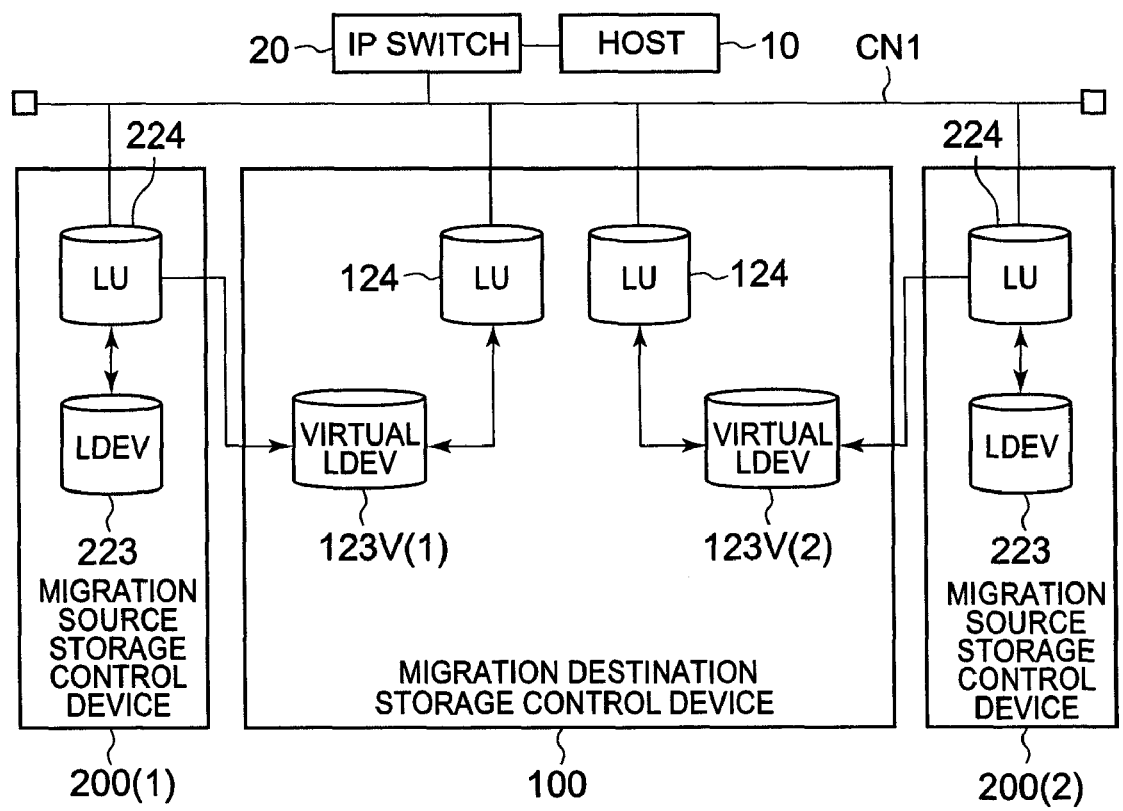
FIG. 12 is an explanatory diagram of an aspect in which a migration target volume is provisionally transferred by using the external connection function.

FIG. 12 is an explanatory diagram that shows a third data migration method. This data migration method can be called external connection mode. In external connection mode, by associating the migration source volume 224 which is the migration target volume with virtual logical devices 123V (1) and 123V (2) in the migration destination storage control device 100, the migration source volume 224 is incorporated within the migration destination storage control device 100. By associating the virtual logical devices 123V (1) and 123V (2) with the logical volume 124 of the migration destination storage control device 100, the host 10 is able to access the migration target data. The host 10 is able to utilize the migration target data without completely identifying where the migration target data are actually stored. Thus, the migration target data can be transferred to the migration destination storage control device 100 without changing the actual storage destination of the migration target data. External connection mode is used when the directory structure managed by the migration source storage control device 200 and the range of the transferred volume do not match, as will be described subsequently.

An aspect in which the content established for the respective Tables T1 to T4 of the migration destination storage control device 100 changes during data migration will now be described on the basis of FIGS. 13 to 18.

Figure 13:
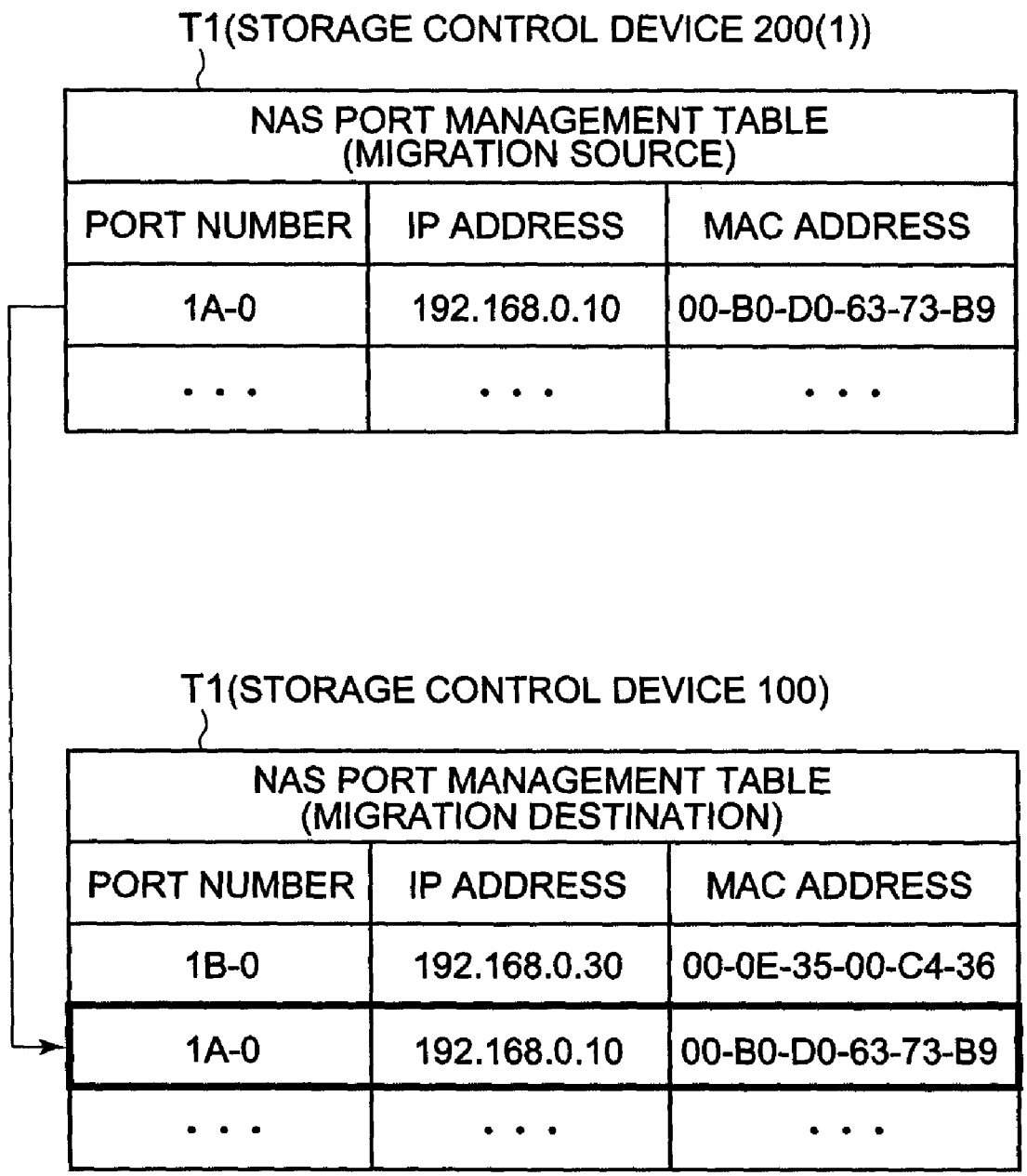
FIG. 13 is an explanatory diagram of an aspect in which information of a communication port that is related to the migration target volume is registered in the migration destination.

FIG. 13 shows an aspect in which the NAS port number of the first migration source storage control device 200(1) is registered in the migration destination storage control device 100. The NAS port number is a number that specifies a communication port 211A that provides NAS services to the host 10.

As shown in FIG. 13, when data are transferred from the first migration source storage control device 200(1) to the migration destination storage control device 100, the port number for supplying NAS services to the first migration source storage control device 200(1) is registered in the NAS port management table T1 of the migration destination storage control device 100.

Figure 14:
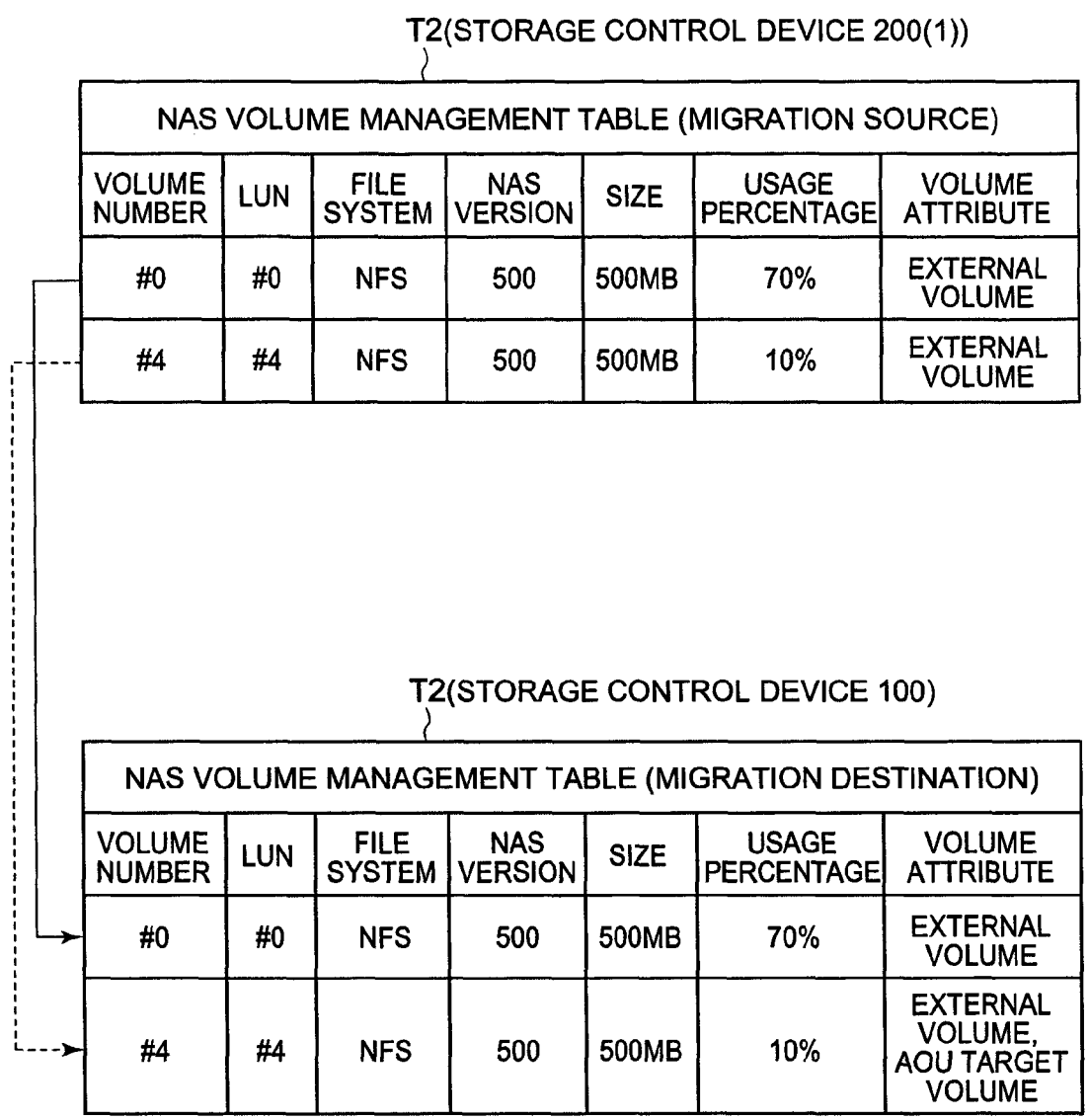
FIG. 14 is an explanatory diagram of an aspect in which information related to the migration target volume is registered in the migration destination.

FIG. 14 shows an aspect in which information related to the logical volume 224 for which migration from the first migration source storage control device 200(1) to the migration destination storage control device 100 is scheduled is registered in the migration destination storage control device 100.

For example, when the logical volumes 224 with volume numbers '#0' and '#4' are the migration targets, migration target information related to the migration target logical volumes 224 (#0, #4) that is stored in the NAS volume management table T2 of the first migration source storage control device 200(1) is registered in the NAS volume management table T2 of the migration destination storage control device 100. In other words, an entry that is related to the migration target logical volume 224 is added to the NAS volume management table T2 of the migration destination storage control device 100.

Figure 15:
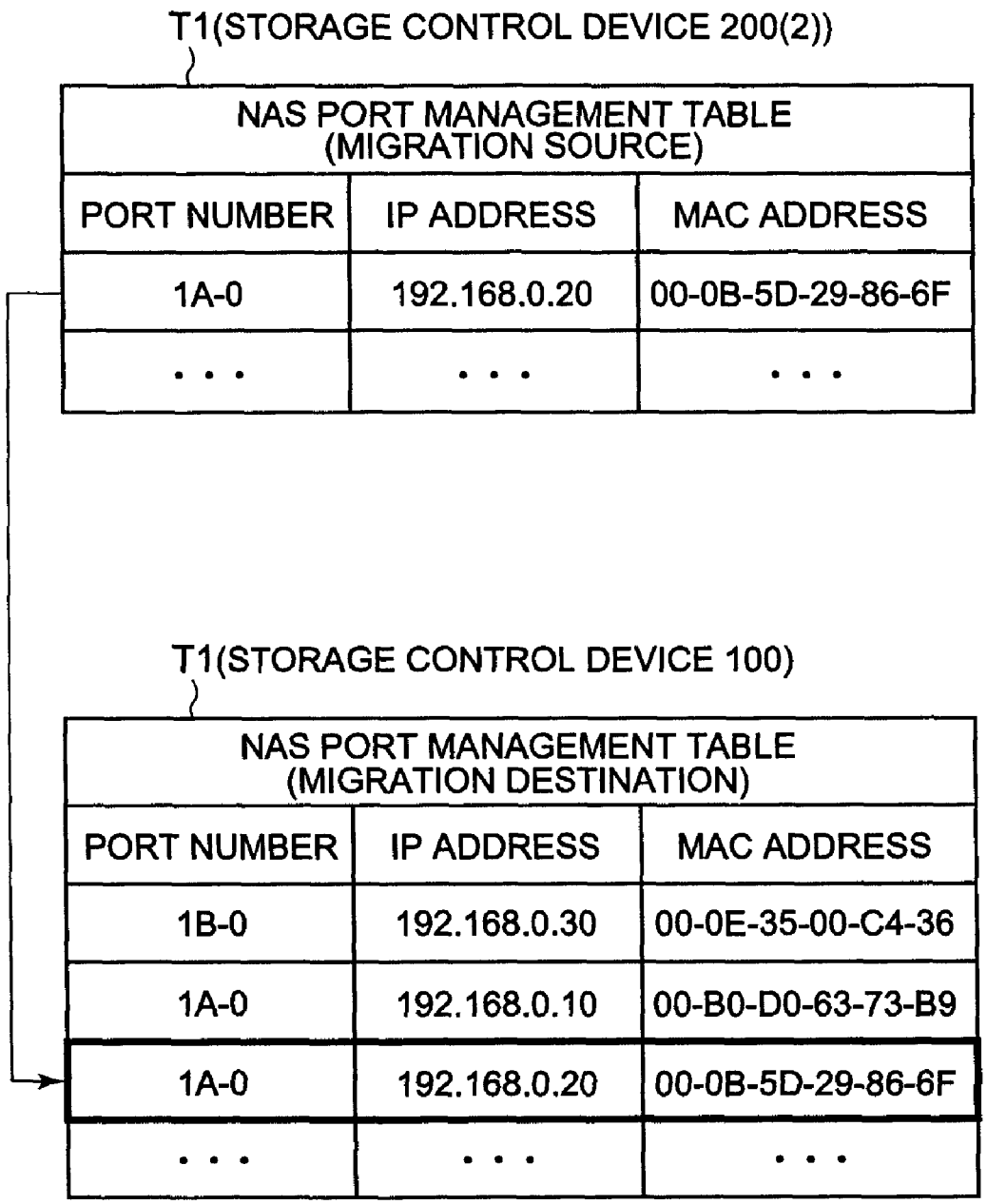
FIG. 15 is an explanatory diagram like that in FIG. 13.

FIG. 15 shows an aspect in which the NAS port number of the second migration source storage control device 200 (2) is registered in the migration destination storage control device 100. Likewise as above, an entry related to the communication port 211A associated with the migration target logical volume 224 is created in the NAS port management table T1 of the migration destination storage control device 100.

FIG. 16 shows an aspect in which information related to the scheduled logical volume 224 that is transferred from the second migration source storage control device 200 (2) to the migration destination storage control device 100 is registered in the migration destination storage control device 100. As illustrated by FIG. 14, an entry related to the scheduled logical volume 224 that is transferred from the second migration source storage control device 200 (2) to the migration destination storage control device 100 is created in the NAS volume management table T2 of the migration destination storage control device 100.

Figure 17:
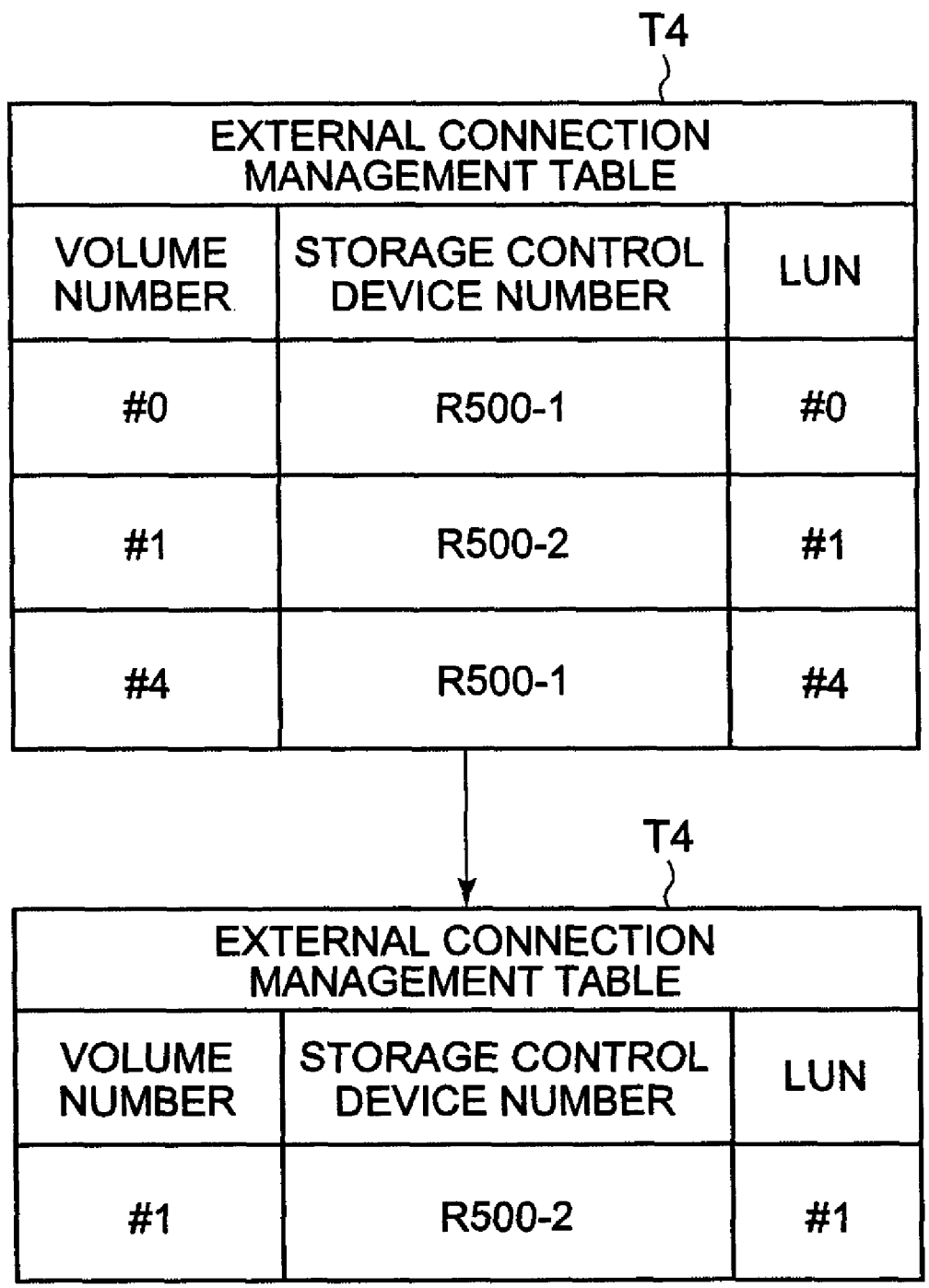
FIG. 17 is an explanatory diagram that shows an aspect in which the stored content of the external connection management table varies before and after completion of the data migration.

FIG. 17 shows an aspect in which the external connection management table T4 of the migration destination storage control device 100 varies before and after completion of the data migration. As shown at the top of FIG. 17, prior to completion of the data migration, an entry that is related to a logical volume 224 (external volume 224) that is externally connected to the migration destination storage control device 100 among the respective logical volumes 224 in the first migration source storage control device 200 (1) and the second migration source storage control device 200 (2) is registered in the external connection management table T4.

As shown at the bottom of FIG. 17, when data migration from the respective migration source storage control device 200 to the migration destination storage control device 100 is complete, the entries related to the logical volumes 224 (#0 and #4) transferred from the first migration source storage control device 200 (1) are erased from the external connection management table T4.

In this embodiment, as mentioned in FIG. 11, data are transferred from the first migration source storage control device 200 (1) to the migration destination storage control device 100 by means of the volume copy mode. Hence, the migration target data are stored in the RAID group 122 which is a physical storage device in the migration destination storage control device 100 and, therefore, there is no need to externally connect the migration source volume 224 in the first migration source storage control device 200 (1) to the migration destination storage control device 100. Therefore, the migration destination storage control device 100 erases the entries related to the logical volume 224 that has been transferred by volume copy mode from the external connection management table T4.

On the other hand, as illustrated by FIG. 11, file copy mode is used in the data migration from the second migration source storage control device 200 (2) to the migration destination storage control device 100. The migration destination storage control device 100 uses the migration source volume 224 in the second migration source storage control device 200 (2) by continuing to use the external connection function as is even after completion of data migration by means of the file copy mode.

Figure 18:
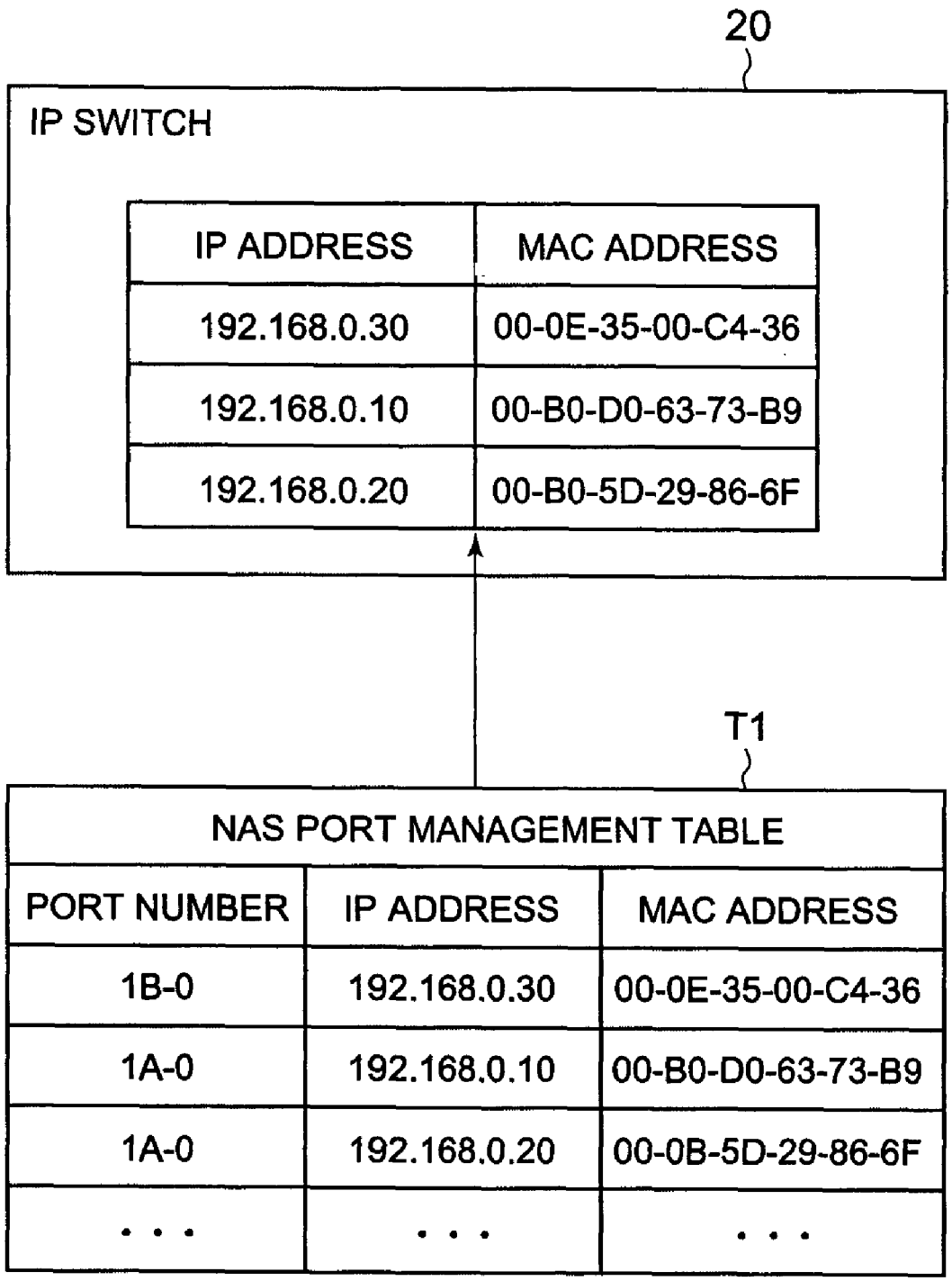
FIG. 18 is an explanatory diagram of an aspect in which address information is registered in an IP switch.

FIG. 18 is an explanatory diagram that shows the content of the settings for the IP switch 20. The migration destination storage control device 100 causes the IP switch 20 to register the content set in the NAS port management table T1 during data migration.

As a result, the migration destination storage control device 100 inherits the IP addresses and so forth used by the respective migration source storage control devices 200 and, thereafter, the access destination from the host 10 constitutes the migration destination storage control device 100. The host 10 does not signify the fact that the access target volume has been transferred from the migration source storage control device 200 to the migration destination storage control device 100.

Figure 19:
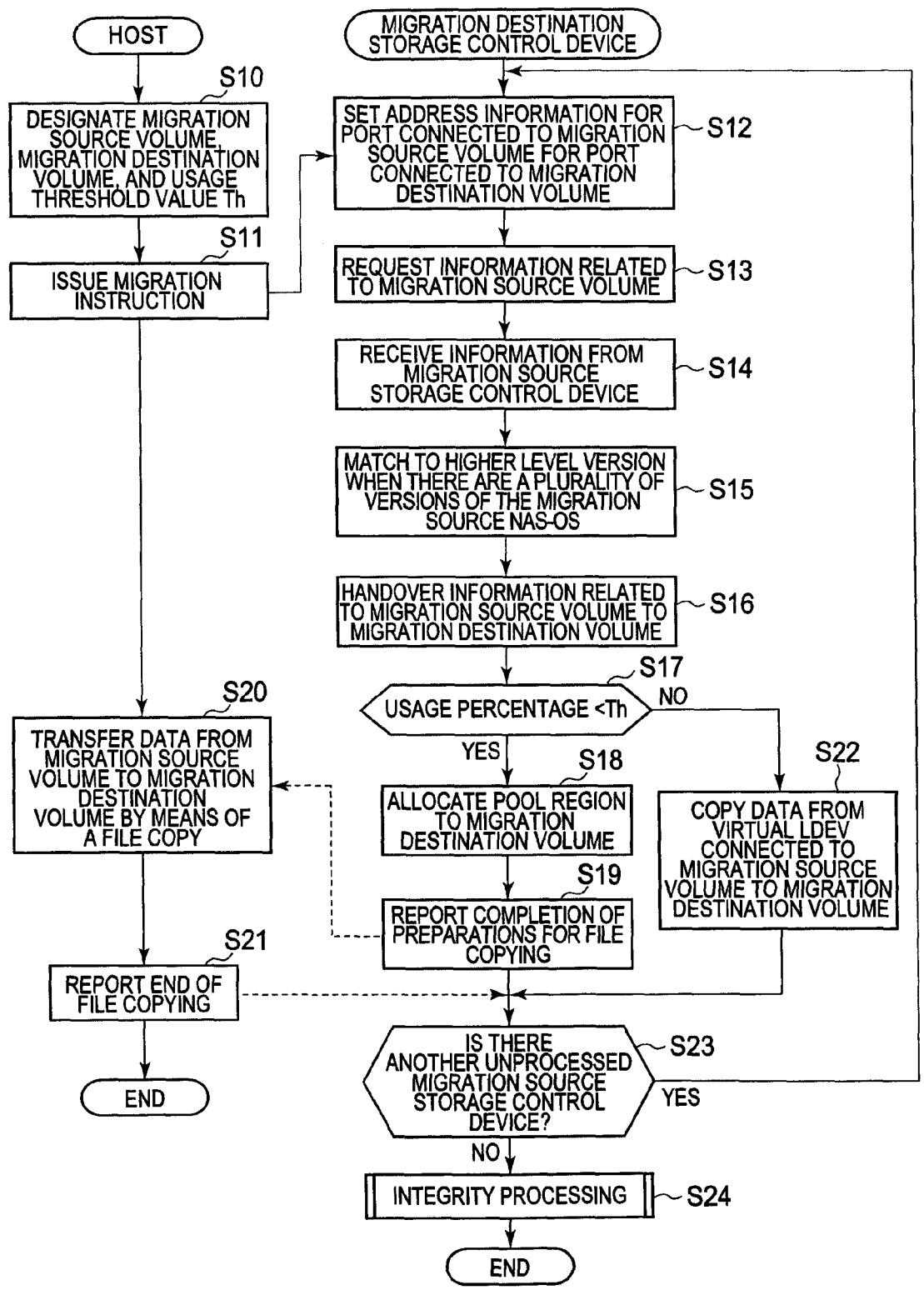
FIG. 19 is a flowchart showing data migration processing.

FIG. 19 is a flowchart showing data migration processing of this embodiment. When the data migration processing is started, the migration source volume 224 which is the migration target and the migration destination volume 124 are externally connected.

First, the user uses the migration instruction section 11 of the host 10 to designate the threshold value Th used in the judgment of the migration source volume, migration destination volume and usage frequency (S10). Thereafter, the user instructs the migration destination storage control device 100 to perform data migration (S11).

Further, the constitution may be such that, when the setting values related to the data migration (migration source volume, migration destination volume, and threshold value Th) are input, the data migration start time and the data migration start conditions and so forth, for example, are input. As a result, data migration can be started at a pre-designated time or data migration can be started in cases where the frequency of file access requests from the host 10 falls to a pre-designated value.

When the start of data migration is instructed, the migration destination storage control device 100 allows the communication port 111A related to the migration destination volume 124 to receive the address information of the communication port 211A that is related to the migration source volume 224 (S12). In other words, the migration destination storage control device 100 registers address information that is related to the migration target logical volume 224 in the NAS port management table T1.

Thereafter, the migration destination storage control device 100 issues a request to the migration source storage control device 200 for information related to the migration source volume 224 (S13). Upon acquiring information related to the migration source volume 224 from the migration source storage control device 200, the migration destination storage control device 100 stores the acquired information in the NAS volume management table T2 (S14). Further, in S14, information related to the constitution of the directory managed by the NAS-OS of the migration source storage control device 200 is also acquired by the migration destination storage control device 100 from the migration source storage control device 200.

When there are a plurality of migration source storage control devices 200 and the versions of the respective NAS-OS differ, the migration destination storage control device 100 matches the versions with the version of the highest level NAS-OS (S16).

The migration destination storage control device 100 passes on information related to the migration source volume 224 to the migration destination volume 124 (S17).

The migration destination storage control device 100 compares the usage percentage of the migration source volume 224 and the threshold value Th and judges whether the usage percentage is less than the threshold value Th (S18). When the usage percentage is less than the threshold value Th (S18: YES), the migration destination storage control device 100 generates the migration destination volume 124 as a virtual logical volume that uses the AOU function by allocating the pool region 125 to the migration destination volume 124 (S19). A volume that is generated virtually by using the AOU function is sometimes called an AOU volume in this embodiment.

The migration destination storage control device 100 reports the fact that file copy preparations are complete to the host 10 (S19). The host 10 reads data in file units from the migration source volume 224 and writes the read data to the migration destination volume 124 (S20). After all the files in the migration source volume 224 have been read and written to the migration destination volume 124, the host 10 reports the fact that file copy is complete to the migration destination storage control device 100 (S21). The constitution may be such that the NAS package 111 in the migration destination storage control device 100 executes the file copy by using the communication channel CN1.

However, when the usage percentage of the migration source volume 224 is equal to or more than the threshold value Th (S17: NO), the migration destination storage control device 100 executes volume copy mode (S22). In other words, the migration destination storage control device 100 copies data in block units from the virtual logical device 123V that is associated with the migration source volume 224 to the logical device 123 that is associated with the migration destination volume 124.

The migration destination storage control device 100 judges whether a migration source storage control device 200 for which data migration is not complete exists (S23). When an unprocessed migration source storage control device 200 exists (S23: YES), the migration destination storage control device 100 returns to S12 and executes each of the above steps.

After the data migration from all of the migration source storage control devices 200 to the migration destination storage control device 100 is complete (S23: NO), the migration destination storage control device 100 executes integrity processing (S24).

Figure 20:
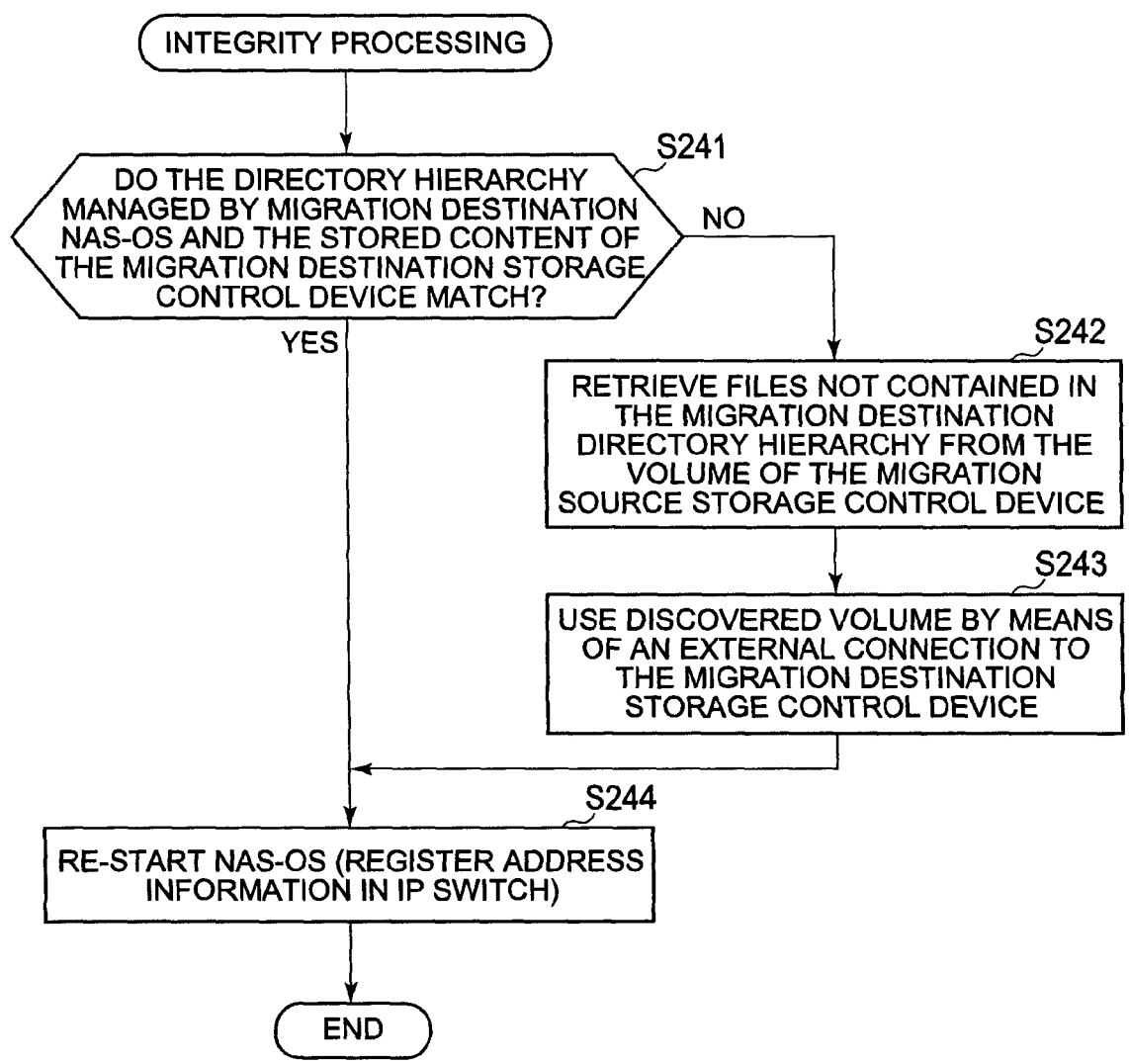
FIG. 20 is a flowchart showing integrity processing in FIG. 19.

FIG. 20 is a flowchart that shows the details of the integrity processing shown in S24 in the flowchart of FIG. 19. The migration destination storage control device 100 judges whether the directory hierarchy managed by the migration destination NAS-OS 111B and the data (files) stored in the migration destination storage control device 100 match (S241).

When the data stored in the migration destination storage control device 100 and the directory structure managed by the migration destination storage control device 100 match (S241:YES), the migration destination storage control device 100 reactivates the NAS-OS 111B and registers the address information in the IP switch 20 (S244).

When data stored in the migration destination storage control device 100 and the directory structure managed by the NAS-OS 111B do not match (S241: NO), the migration destination storage control device 100 accesses the migration source storage control devices 200 to conduct a search to determine which logical volume 224 has a file that is not contained in the directory structure managed by the NAS-OS 111B (S242).

The migration destination storage control device 100 uses the external connection function to incorporate the logical volume 224 found in S242 in the migration destination storage control device 100 (S243). As a result, the migration destination storage control device 100 is able to access the file stored in the logical volume 224 thus found and is able to supply this file to the host 10.

Figure 21:
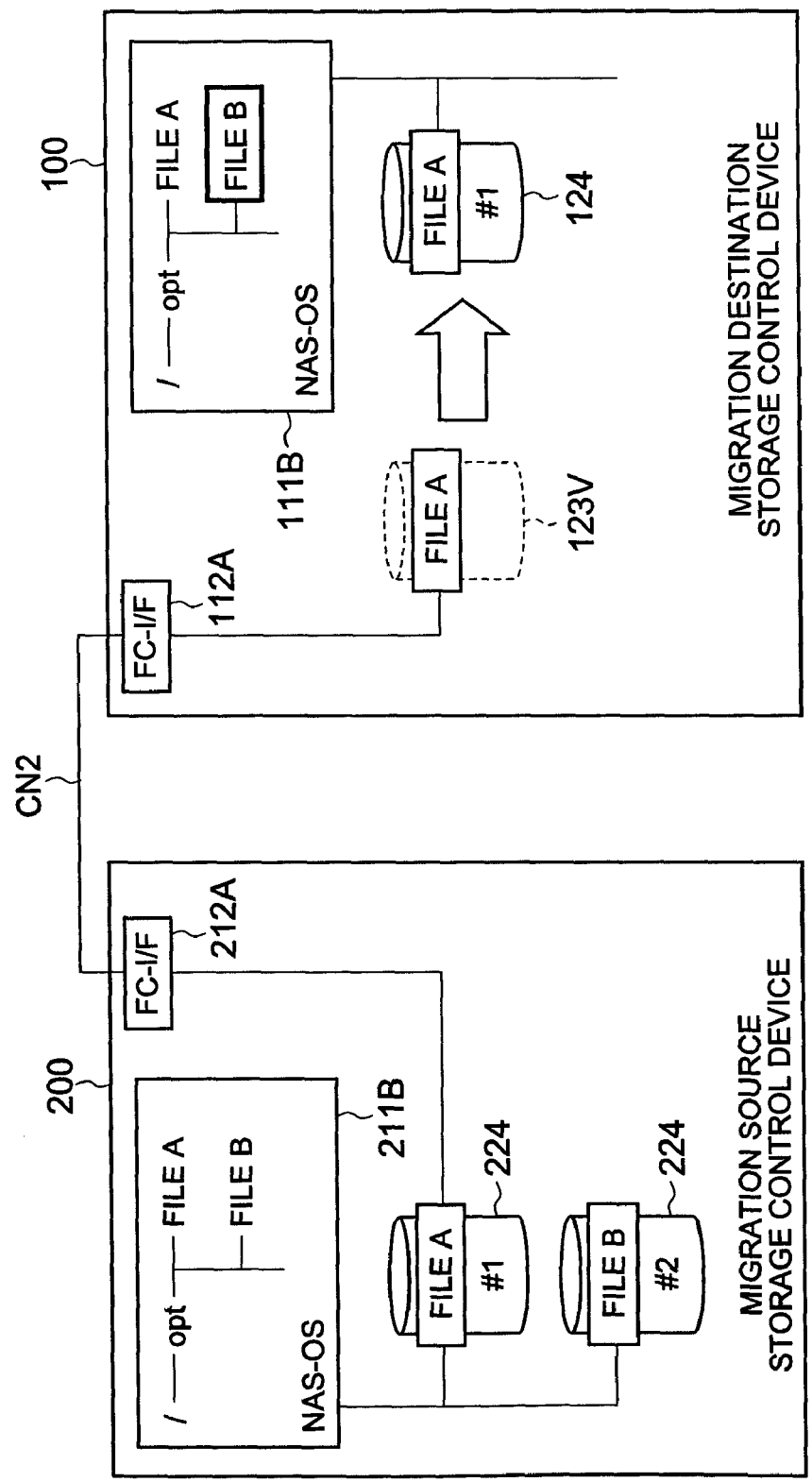
FIG. 21 is an explanatory diagram of an aspect in a case where only some of the volumes in the migration source storage control device are designated as the migration target.

A case where the integrity processing is required will be described with reference to FIGS. 21 and 22. As shown in FIG. 21, let us suppose that, of files A and B which are stored in the migration source storage control device 200, file A is designated as the migration target. In other words, only the logical volume 224 (#1) in which file A is stored is designated as the migration target.

When logical volume 224 (#1) that comprises file A is transferred to the migration destination storage control device 100, the directory structure managed by the NAS-OS of the migration source storage control device 200 is also passed on to the migration destination storage control device 100. The directory structure is not only the location of the migration target file A but also the location of file B. However, the logical volume 224 (#2) that comprises file B is not the migration target and the migration destination directory structure and the range of the data that can be managed by the migration destination storage control device 100 do not match.

Thus, when only some of the logical volumes 224 of the respective logical volumes 224 of the migration source storage control device 200 are transferred, the directory structure at the migration destination and the range of the transferred data do not match.

Figure 22:
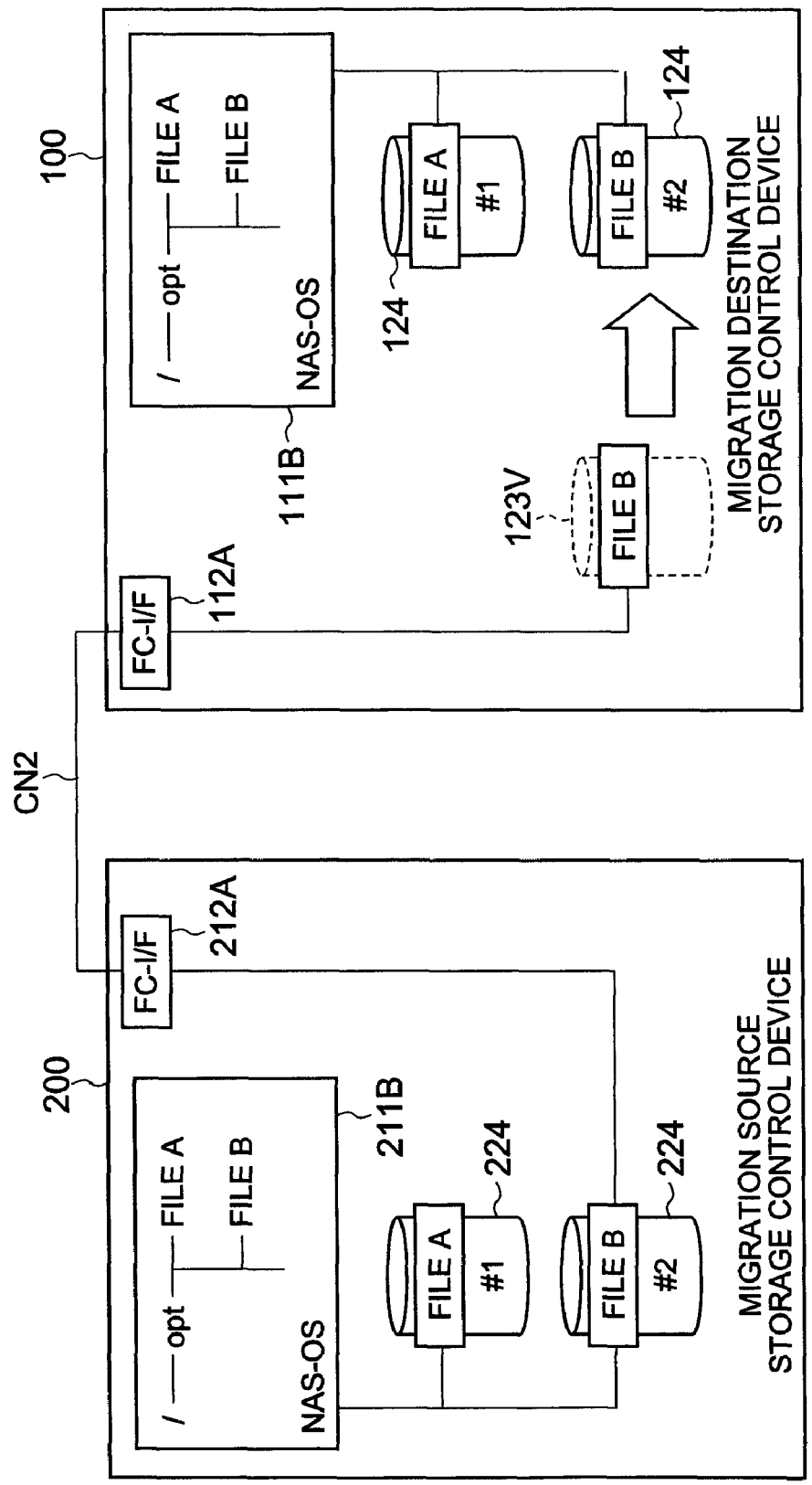
FIG. 22 is an explanatory diagram of an aspect in which a volume that has been explicitly designated as a migration target is provisionally transferred to the migration destination storage control device by using the external connection function.

Therefore, as shown in FIG. 22, the migration destination storage control device 100 virtually transfers the unmatched logical volume 224 (#2) into the migration destination storage control device 100 by connecting the unmatched logical volume 224 (#2) to the virtual logical device 123V. As a result, the migration destination storage control device 100 is also able to access the logical volume 224 that has not been designated as a migration target and is able to process file access requests from the host 10. As described earlier, because the external logical volume 224 (#2) is incorporated in the migration destination storage control device 100 by using the virtual logical device 123V, the physical storage device in the migration destination storage control device 100 is not consumed.

This embodiment with such a constitution affords the following effects. In this embodiment, any one data migration method is selected from among a plurality of data migration methods that are pre-prepared in accordance with the usage status of the migration target volume and the migration target volume is transferred by using the selected data migration method. Hence, a volume can be transferred by using a more suitable data migration method and user convenience increases.

In this embodiment, when the usage percentage of the migration target volume is equal to or more than the predetermined threshold value, volume copy mode is used and, when the usage percentage is less than the predetermined threshold value, file copy mode is used. Hence, a suitable data migration method can be selected in accordance with the usage status of a volume and the data migration time can be shortened by preventing wasteful data transfer.

In this embodiment, when the usage percentage is less than the predetermined threshold value, the migration destination volume is generated virtually by using a pool region. Therefore, the migration destination volume can be generated with a size that corresponds with the migration target data amount and the storage resource of the migration destination storage control device can be efficiently used.

In this embodiment, when only some of the logical volumes 224 in the migration source storage control device 200 are transferred to the migration destination storage control device 100, the logical volumes 224 that have not been designated as the migration target (called the 'non-migration target volumes' hereinbelow) can be used by the migration destination storage control device 100 by using the external connection function. Therefore, in this embodiment, the directory structure managed by the migration destination NAS-OS 111B and the range of the data that can be used by the migration destination storage control device 100 can be matched without consuming the storage resources of the migration destination storage control device 100 (the RAID group 122 which is a physical storage device).

Thereafter, in cases where the user issues an instruction for the first time for the migration of the non-migration target volumes, the volumes are transferred to the migration destination storage control device 100 by means of the volume copy mode or the file copy mode in accordance with the usage status from the host 10.

Therefore, in other words, the integrity processing is also called processing that makes preparations for replacing the migration source storage control device 200 with the migration destination storage control device 100 by transferring all the data (data of the files used in the NAS services) from the migration source storage control device 200 to the migration destination storage control device 100.

For example, the user is able to rapidly utilize the performance and functions and so forth of the migration destination storage control device 100 by transferring only the frequently used volumes to the migration destination storage control device 100 and preparations for future replacement can also be completed at the same time as the initial data migration. Hence, user convenience improves.

For example, when the migration destination storage control device 100 is a new product and same has a higher performance and functionality than the migration source storage control device 200, the frequently used volumes are transferred to the migration destination storage control device 100, whereby user convenience is favorable. Because there is a surplus in the spare capacity of the cache memory, for example, the migration destination storage control device 100 is able to rapidly process the file access request from the host 10. In such a case, the volumes that are used frequently by the host 10 are first transferred to the migration destination storage control device 100 by the volume copy mode.

The non-migration target volumes are incorporated in the migration destination storage control device 100 by the external connection function and can be used by the migration destination storage control device 100. Hence, even in a case where the access destination of the host 10 is switched from the migration source storage control device 200 to the migration destination storage control device 100, the migration destination storage control device 100 is able to normally process a file access request from the host 10.

The non-migration target volume that is externally connected to the migration destination storage control device 100 is provisionally transferred to the migration destination storage control device 100. This state can be called provisional data migration or temporary data migration. When official migration is instructed, the provisionally transferred volume is transferred to the migration destination storage control device 100 by either the volume copy mode or the file copy mode.

Thus, according to this embodiment, by organically linking the external connection function, volume copy mode, and file copy mode, the user is provided with more convenient data migration.

Furthermore, the present invention is not limited to the above embodiment. A person skilled in the art is able to make a variety of additions and modifications and so forth within the scope of the present invention. For example, in the above embodiment, although a case where data migration using file copying and data migration using volume copying are executed simultaneously was provided by way of example, the present invention is not limited to such a case and either of these types of data migration can be performed. In the above embodiment, although a case where data are transferred from a plurality of migration source storage control devices to one migration destination storage control device was provided by way of example, the present invention is not limited to such a case. The present invention is also applicable in cases where data are transferred from a plurality of migration source storage control devices to a plurality of migration destination storage control devices, where data are transferred from one migration source storage control device to one migration destination storage control device, and where data are transferred from one migration source storage control device to a plurality of migration destination storage control devices.

What is claimed is:

1. A file sharing system comprising:

a migration source file sharing device;

a migration destination file sharing device;

a first communication channel for connecting a higher level device, the migration source file sharing device, and the migration destination file sharing device; and a second communication channel provided separately from the first communication channel for mutually connecting the migration source file sharing device and the migration destination file sharing device;

wherein the migration destination file sharing device generates a migration destination volume in the migration destination file sharing device as a virtual volume of a migration source volume of the migration source file sharing device, wherein the migration destination file sharing device determines a usage percentage of the migration source volume by the higher level device via the first communication channel, wherein if the usage percentage of the migration source volume exceeds a threshold value, the migration destination file sharing device associates a first logical volume, configured by a certain physical device of the migration destination file sharing device, and the migration destination volume, migrates data stored in the migration source volume to the first logical volume by block unit of data via the second communication channel, and writes data to the first logical volume in response to write requests from the higher level device to the migration destination volume after migration, and wherein if the usage percentage of the migration source volume does not exceed the threshold value, the migration destination file sharing device associates a second logical volume configured by pool storage area of physical devices of the migration destination file sharing device and the migration destination volume, migrates data stored in the migration source volume to the second logical volume by file unit of data via the first communication channel, allocates storage area from the pool storage area to the second logical volume by file unit of data during the migration, and allocates storage area from the pool storage area to the second logical volume in response to write requests from the higher level device to the migration destination volume after migration.

2. The file sharing system according to claim 1, wherein the first communication channel performs a file-level data transfer and the second communication channel performs a block-level data transfer.

3. The file sharing system according to claim 1, wherein the migration destination file sharing device transfers a complete directory structure of the migration source file sharing device to the migration destination file sharing device before the migration of data stored in the migration source volume, wherein the directory structure transferred into the migration destination file sharing device contains at least one non-migration target logical volume of the migration source file sharing device that is not designated as a migration target, and the migration destination file sharing device virtualizes said non-migration target logical volume as a virtual logical device therein by connecting said non-migration target logical volume to the virtual logical device, and processes file access requests from the higher level device addressed to said non-migration target logical volume by accessing said non-migration target logical volume.

4. The file sharing system according to claim 3, wherein the migration source volume of the migration source file sharing device is more frequently used than said non-migration target logical volume of the migration source file sharing device.

5. The file sharing system according to claim 4, wherein when the directory structure and the range of data transferred from the migration source file sharing device to the migration destination file sharing device do not match, a data migration section accesses untransferred data, which are stored in said one migration source volume contained in the directory structure but have not been transferred from the migration source file sharing device to the migration destination file sharing device, via the migration destination file sharing device by a second virtual logical storage device which is provided in the migration destination file sharing device such that the untransferred volume corresponding to the untransferred data is connected to said second virtual logical storage device.

6. A migration destination file sharing device connected to a migration source file sharing device, comprising:
   a plurality of physical devices; and
   a controller for controlling the physical devices and connected to a higher level device via a first communication channel and connected to the migration source file sharing device via a second communication channel provided separately from the first communication channel;
   wherein the controller generates a migration destination volume in the migration destination file sharing device as a virtual volume of a migration source volume of the migration source file sharing device,
   wherein the controller determines a usage percentage of the migration source volume by the higher level device via the first communication channel,
   wherein if the usage percentage of the migration source volume exceeds a threshold value, the controller associates a first logical volume, configured by a certain physical device of the migration destination file sharing device, and the migration destination volume, migrates data stored in the migration source volume to the first logical volume by block unit of data via the second communication channel, and writes data to the first logical volume in response to write requests from the higher level device to the migration volume after migration, and
   wherein if the usage percentage of the migration source volume does not exceed the threshold value, the controller associates a second logical volume configured by pool storage area of physical devices of the migration destination file sharing device and the migration destination volume, migrates data stored in the migration source volume to the second logical volume by file unit of data via the first communication channel, allocates storage area from the pool storage area to the second logical volume by file unit of data during the migration, and allocates storage area from the pool storage area to the second logical volume in response to write requests from the higher level device to the migration destination volume after migration.

7. The migration destination file sharing device according to claim 6, wherein the migration source file sharing device transfers a complete directory structure of the migration source file sharing device to the migration destination file sharing device before the migration of data stored in the migration source volume, and
   wherein the directory structure transferred into the migration destination files sharing device contains at least one non-migration target logical volume of the migration source file sharing device that is not designated as a migration target, and the migration destination file sharing device virtualizes said non-migration target logical volume as a virtual logical device therein by connecting said non-migration target logical volume to the virtual logical device, and processes file access requests from the higher level device addressed to said non-migration target logical volume by accessing said non-migration target logical volume.

8. The migration destination file sharing device according to claim 7, wherein the migration source volume of the migration source file sharing device is more frequently used than said non-migration target logical volume of the migration source file sharing device.

9. The migration destination file sharing device according to claim 7, wherein when the directory structure and the range of data transferred from the migration source file sharing device to the migration destination file sharing device do not match, a data migration section accesses untransferred data, which are stored in said one migration source volume contained in the directory structure but have not been transferred from the migration source file sharing device to the migration destination file sharing device, via the migration destination file sharing device by a second virtual logical storage device which is provided in the migration destination file sharing device such that the untransferred volume corresponding to the untransferred data is connected to said second virtual logical storage device.

10. The migration file destination sharing device according to claim 6, wherein the first communication channel performs a file-level data transfer and the second communication channel performs a block-level data transfer.

11. A file sharing volume migration method of a file sharing system including a migration source file sharing device and a migration destination file sharing device, comprising the steps of:
   connecting a higher level device, the migration source file sharing device, and the migration destination file sharing device via a first communication channel;
   connecting the migration source file sharing device and the migration destination file sharing device mutually via a second communication channel provided separately from the first communication channel;
   generating migration destination volume in the migration destination file sharing device as a virtual volume of a migration source volume of the migration source file sharing device; and determining a usage percentage of the migration source volume by the higher level device via the first communication channel;

wherein if the usage percentage of the migration source volume exceeds a threshold value, the migration destination file sharing device associates a first logical volume configured by a certain physical device of the migration destination file sharing device and the migration destination volume, migrates data stored in the migration source volume to the first logical volume by block unit of data via the second communication channel, and writes data to the first logical volume in response to write requests from the higher level device to the migration destination volume after migration, and wherein if the usage percentage of the migration source volume does not exceed the threshold value, the migration destination file sharing device associates a second logical volume, configured by pool storage area of physical devices of the migration destination file sharing device, and the migration destination volume, migrates data stored in the migration source volume to the second logical volume by file unit of data via the first communication channel, allocates storage area from the pool storage area to the second logical volume by file unit of data during the migration, and allocates storage area from the pool storage area to the second logical volume in response to write requests from the higher level device to the migration destination volume after migration.

* * * * *